United States Patent
Liu et al.

(10) Patent No.: US 11,734,955 B2
(45) Date of Patent: Aug. 22, 2023

(54) DISENTANGLED REPRESENTATION LEARNING GENERATIVE ADVERSARIAL NETWORK FOR POSE-INVARIANT FACE RECOGNITION

(71) Applicant: BOARD OF TRUSTEES OF MICHIGAN STATE UNIVERSITY, East Lansing, MI (US)

(72) Inventors: Xiaoming Liu, Okemos, MI (US); Luan Quoc Tran, Haslett, MI (US); Xi Yin, East Lansing, MI (US)

(73) Assignee: BOARD OF TRUSTEES OF MICHIGAN STATE UNIVERSITY, East Lansing, MI (US)

( * ) Notice: Subject to any disclaimer, the term of this patent is extended or adjusted under 35 U.S.C. 154(b) by 0 days.

(21) Appl. No.: 16/648,202

(22) PCT Filed: Sep. 18, 2018

(86) PCT No.: PCT/US2018/051552
§ 371 (c)(1),
(2) Date: Mar. 17, 2020

(87) PCT Pub. No.: WO2019/056000
PCT Pub. Date: Mar. 21, 2019

(65) Prior Publication Data
US 2020/0265219 A1    Aug. 20, 2020

Related U.S. Application Data

(60) Provisional application No. 62/560,001, filed on Sep. 18, 2017.

(51) Int. Cl.
*G06V 40/16* (2022.01)
*G06N 20/00* (2019.01)
(Continued)

(52) U.S. Cl.
CPC .......... *G06V 40/172* (2022.01); *G06F 18/214* (2023.01); *G06N 20/00* (2019.01);
(Continued)

(58) Field of Classification Search
CPC .......... G06K 9/00288; G06K 9/00248; G06K 9/00268; G06K 9/6256; G06N 20/00
See application file for complete search history.

(56) References Cited

U.S. PATENT DOCUMENTS

| 10,445,622 | B2* | 10/2019 | Kicanaoglu | G06T 7/564 |
| 2016/0125572 | A1* | 5/2016 | Yoo | G06V 10/82 |
| | | | | 382/157 |

(Continued)

FOREIGN PATENT DOCUMENTS

CN    106874861 A    6/2017

OTHER PUBLICATIONS

Abaza, et al, "Design and evaluation of photometric image quality measures for effective face recognition," IET Biometrics, vol. 3, pp. 314-324, 2014.

(Continued)

*Primary Examiner* — Md K Talukder
(74) *Attorney, Agent, or Firm* — Quarles & Brady LLP

(57) ABSTRACT

A system and method for identifying a subject using imaging are provided. In some aspects, the method includes receiving an image depicting a subject to be identified, and applying a trained Disentangled Representation learning-Generative Adversarial Network (DR-GAN) to the image to generate an identity representation of the subject, wherein the DR-GAN comprises a discriminator and a generator having at least one of an encoder and a decoder. The method also includes identifying the subject using the identity representation, and generating a report indicative of the subject identified.

28 Claims, 15 Drawing Sheets
(13 of 15 Drawing Sheet(s) Filed in Color)

(51) Int. Cl.
G06F 18/214 (2023.01)
G06V 10/24 (2022.01)
(52) U.S. Cl.
CPC .......... *G06V 10/242* (2022.01); *G06V 40/165* (2022.01); *G06V 40/168* (2022.01)

(56) References Cited

U.S. PATENT DOCUMENTS

| | | | | |
|---|---|---|---|---|
| 2018/0075581 | A1* | 3/2018 | Shi | G06T 3/4046 |
| 2018/0336434 | A1* | 11/2018 | Kicanaoglu | G06V 10/454 |
| 2019/0057521 | A1* | 2/2019 | Teixeira | G06N 20/00 |
| 2019/0080205 | A1* | 3/2019 | Kaufhold | G06N 3/047 |
| 2019/0279075 | A1* | 9/2019 | Liu | G06T 11/00 |
| 2020/0265219 | A1* | 8/2020 | Liu | G06V 40/165 |
| 2021/0224524 | A1* | 7/2021 | Liu | G06F 18/2113 |
| 2021/0232803 | A1* | 7/2021 | Fu | G06V 40/168 |

OTHER PUBLICATIONS

Abdalmageed, et al, "Face recognition using deep multi-pose representations," in Proc. IEEE Winter Conf. Appl. Comput. Vis., 2016, pp. 1-9.
Abdel-Mottaleb et al, "Application notes-algorithms for assessing the quality of facial images," IEEE Comput. Intell. Mag., vol. 2, No. 2, pp. 10-17, May 2007.
Abiantun, et al, "Sparse feature extraction for pose-tolerant face recognition," IEEE Trans. Pattern Anal. Mach. Intell., vol. 36, No. 10, pp. 2061-2073, Oct. 2014.
Atoum, et al, "Monocular Video-based Trailer Coupler Detection using Multiplexer Convolutional Neural Network," under review in CVPR 2017.
Bengio, et al, "Representation learning: A review and new perspectives," IEEE Trans. Pattern Anal. Mach. Intell., vol. 35, No. 8, pp. 1798-1828, Aug. 2013.
Berthelot, et al, "BEGAN: Boundary equilibrium generative adversarial networks," arXiv: 1703.10717, 2017.
Bharadwaj, et al, "Biometric quality: A review of fingerprint, iris, and face," EURASIP J. Image Video Process., vol. 2014, 2014, Art. no. 34.
Chai, et al, "Locally linear regression for pose-invariant face recognition," IEEE Trans. Image Process., vol. 16, No. 7, pp. 1716-1725, Jul. 2007.
Chen, et al, "Fisher vector encoded deep convolutional features for unconstrained face verification," in Proc. IEEE Int. Conf. Image Process., 2016, pp. 2981-2985.
Chen, et al, "FSRNet: End-to-end learning face super-resolution with facial priors," in Proc. IEEE Conf. Comput. Vis. Pattern Recognit., 2018.
Chen, et al, "InfoGAN: Interpretable representation learning by information maximizing generative adversarial nets," in Proc. Int. Conf. Neural Inf. Process. Syst., 2016, pp. 2172-2180.
Chen, et al, "Localized iris image quality using 2-D wavelets," in Proc. Int. Conf. Biometrics, 2006, pp. 373-381.
Chen, et al, "Unconstrained face verification using deep CNN features," in Proc. IEEE Winter Conf. Appl. Comput. Vis., 2016, pp. 1-9.
Denton, et al, "Deep generative image models using a Laplacian pyramid of adversarial networks," in Proc. 28th Int. Conf. Neural Inf. Process. Syst., 2015, pp. 1486-1494.
Ding et al, "A comprehensive survey on pose-invariant face recognition," ACM Trans. Intell. Syst. Technol., vol. 7, 2016, Art. No. 37.
Ding et al, "Robust face recognition via multimodal deep face representation," IEEE Trans. Multimedia, vol. 17, No. 11, pp. 2049-2058, Nov. 2015.
Gauthier, J. "Conditional generative adversarial nets for convolutional face generation." Class Project for Stanford CS231N: Convolutional Neural Networks for Visual Recognition, Winter semester 2014.5 (2014): 2.

Goodfellow, et al, "Generative adversarial nets," in Proc. Int. Conf. Neural Inf. Process. Syst., 2014, pp. 2672-2680.
Gross, et al, "Multi-PIE," Image Vis. Comput., vol. 28, pp. 807-813, 2010.
Grother et al, "Performance of biometric quality measures," IEEE Trans. Pattern Anal. Mach. Intell., vol. 29, No. 4, pp. 531-543, Apr. 2007.
Hassner, et al, "Effective face frontalization in unconstrained images," in Proc. IEEE Conf. Comput. Vis. Pattern Recognit., 2015, pp. 4295-4304.
International Searching Authority. International Search Report and Written Opinion for application PCT/US2018/051552, dated Jan. 16, 2019. 13 pages.
Jourabloo et al, "Pose-Invariant 3D face alignment," in Proc. IEEE Int. Conf. Comput. Vis., 2015, pp. 3694-3702.
Jourabloo et al, "Pose-invariant face alignment via CNN-based dense 3D model fitting," Int. J. Comput. Vis., vol. 124, pp. 187-203, 2017.
Jourabloo, et al, "Large-pose Face Alignment via CNN-based Dense 3D Model Fitting," in CVPR 2016.
Jourabloo, et al, "Pose-invariant face alignment with a single CNN," in Proc. IEEE Int. Conf. Comput. Vis., 2017, pp. 3219-3228.
Kan, et al, "Stacked Progressive Auto-Encoders (SPAE) for face recognition across poses," in Proc. IEEE Conf. Comput. Vis. Pattern Recognit., 2014, pp. 1883-1890.
Kingma et al, "Adam: A method for stochastic optimization," in Proc. Int. Conf. Learn. Representations, 2015.
Klare, et al, "Pushing the frontiers of unconstrained face detection and recognition: IARPA Janus Benchmark A," in Proc. IEEE Conf. Comput. Vis. Pattern Recognit., 2015, pp. 1931-1939.
Koestinger, et al, "Annotated facial landmarks in the wild: A large-scale, real-world database for facial landmark localization," in Proc. IEEE Int. Conf. Comput. Vis. Workshops, 2011, pp. 2144-2151.
Krichen, et al, "A new probabilistic iris quality measure for comprehensive noise detection," in Proc. 1st IEEE Int. Conf. Biometrics: Theory Appl. Syst., 2007, pp. 1-6.
Kulkarni, et al, "Deep convolutional inverse graphics network," in Proc. 28th Int. Conf. Neural Inf. Process. Syst., 2015, pp. 2539-2547.
Kwak et al, "Ways of conditioning generative adversarial networks," in Proc. Conf. Neural Inf. Process. Syst. Workshops, 2016.
Li, S. et al, "Morphable displacement field based image matching for face recognition across pose," in Proc. Eur. Conf. Comput. Vis., 2012, pp. 102-115.
Lin et al, The augmented lagrange multiplier method for exact recovery of corrupted low-rank matrices. UIUC Tech. Report, 2009.
Liu et al, "Pose-robust face recognition using geometry assisted probabilistic modeling," in Proc. IEEE Conf. Comput. Vis. Pattern Recognit., 2005, pp. 502-509.
Liu, et al, "Face model fitting on low resolution images," in Proc. 17th Brit. Mach. Vis. Conf., 2006, pp. 1079-1088.
Liu, et al, "Joint face alignment and 3D face reconstruction," in Proc. Eur. Conf. Comput. Vis., 2016, pp. 545-560.
Liu, et al, "Optimal pose for face recognition," in Proc. IEEE Conf. Comput. Vis. Pattern Recognit., 2006, pp. 1439-1446.
Liu, M-Y et al. "Coupled generative adversarial networks." Proceedings of the 30th International Conference on Neural Infomnation Processing Systems. 2016.
Makhzani, et al, "Adversarial autoencoders," in Proc. Int. Conf. Learn. Representations Workshops, 2015.
Masi, et al, "Do we really need to collect millions of faces for effective face recognition?" in Proc. Eur. Conf. Comput. Vis., 2016, pp. 579-596.
Masi, et al, "Pose-aware face recognition in the wild," in Proc. IEEE Conf. Comput. Vis. Pattern Recognit., 2016, pp. 4838-4846.
Matovski, et al, "On including quality in applied automatic gait recognition," in Proc. 21st Int. Conf. Pattern Recognit., 2012, pp. 3272-3275.
Mirza et al, "Conditional generative adversarial nets," arXiv:1411.1784, 2014.
Morteza Safdarnejad, S., et al, "Temporally Robust Global Motion Compensation by Keypoint-based Congealing," in ECCV 2016.

(56) References Cited

OTHER PUBLICATIONS

Morteza Safdarnejad, S., et al. (2017). Spatio-Temporal Alignment of Non-Overlapping Sequences From Independently Panning Cameras. In Proceedings of the IEEE Conference on Computer Vision and Pattern Recognition (pp. 3808-3816).
Morteza Safdarnejad, S., et al. "Sports videos in the wild (SVW): A video dataset for sports analysis," In 11th IEEE Int. Conf. Automatic Face and Gesture Recognition, 2015.
Muramatsu, et al, "View transformation model incorporating quality measures for cross-view gait recognition," IEEE Trans. Cybern., vol. 46, No. 7, pp. 1602-1615, Jul. 2016.
Odena, "Semi-supervised learning with generative adversarial networks," in Proc. Int. Conf. Mach. Learn. Workshops, 2016.
Odena, et al, "Conditional image synthesis with auxiliary classifier GANs," in Proc. 34th Int. Conf. Mach. Learn., 2017, pp. 2642-2651.
Ozay, et al, "Improving face recognition with a quality-based probabilistic framework," in Proc. IEEE Comput. Soc. Conf. Comput. Vis. Pattern Recognit. Workshops, 2009, pp. 134-141.
Parkhi, et al, "Deep face recognition," in Proc. Brit. Mach. Vis. Conf., 2015, p. 6.
Radford, et al, "Unsupervised representation learning with deep convolutional generative adversarial networks," in Proc. Int. Conf. Learn. Representations, 2016.
Ranzato, et al., "Unsupervised learning of invariant feature hierarchies with applications to object recognition," in Proc. IEEE Conf. Comput. Vis. Pattern Recognit., 2007, pp. 1-8.
Reed,et al, "Generative adversarial text to image synthesis," in Proc. 33rd Int. Conf. Mach. Learn., 2016, pp. 1060-1069.
Roth, et al, "Adaptive 3D face reconstruction from unconstrained photo collections," IEEE Trans. Pattern Anal. Mach. Intell., vol. 39, No. 11, pp. 2127-2141, Nov. 2017.
Roth, J. et al, "Adaptive 3D Face Reconstruction from Unconstrained Photo Collections," in CVPR 2016.
Roth, J. et al, "Unconstrained 3D Face Reconstruction," in CVPR 2015.
Sagonas, et al, "Robust statistical face frontalization," in Proc. IEEE Int. Conf. Comput. Vis., 2015, pp. 3871-3879.
Salimans, et al, "Improved techniques for training GANs," in Proc. 30th Int. Conf. Neural Inf. Process. Syst., 2016, pp. 2234-2242.
Sankaranarayanan, S., et al. "Triplet Probabilistic Embedding for Face Verification and Clustering." arXiv preprint arXiv:1604.05417 (2016).
Schroff, et al, "FaceNet: A unified embedding for face recognition and clustering," in Proc. IEEE Conf. Comput. Vis. Pattern Recognit., 2015, pp. 815-823.
Sengupta, et al, "Frontal to profile face verification in the wild," in Proc. IEEE Winter Conf. Appl. Comput. Vis., 2016, pp. 1-9.
Tabassi et al, "A novel approach to fingerprint image quality," in Proc. IEEE Int. Conf. Image Process., 2005, pp. II-37.
Tai, Y. et al. "Image super-resolution via deep recursive residual network." Proceedings of the IEEE conference on computer vision and pattern recognition. 2017.
Taigman, et al, "DeepFace: Closing the gap to human-level performance in face verification," in Proc. IEEE Conf. Comput. Vis. Pattern Recognit., 2014, pp. 1701-1708.
Teixeira et al, "A new framework for quality assessment of high-resolution fingerprint images," IEEE Trans. Pattern Anal. Mach. Intell., vol. 39, No. 10, pp. 1905-1917, Oct. 2017.
Tong, et al, "Improving biometric identification through quality-based face and fingerprint biometric fusion," in Proc. IEEE Comput. Soc. Conf. Comput. Vis. Pattern Recognit. Workshops, 2010, pp. 53-60.
Tran et al, "Nonlinear 3D face morphable model," in Proc. IEEE Conf. Comput. Vis. Pattern Recognit., 2018.
Tran, L. et al "Learning with Missing Modalities via Cascaded Residual Autoencoder," under review in CVPR 2017.
Tran, L. et al. "Disentangled Representation Learning GAN for pose-invariant face recognition".2017 IEEE Conference on Computer Vision and Pattern Recognition (CVPR), Jul. 2017, pp. 1283-1292.
Tran, L. et al. "Representation Learning by Rotating Your Faces." arXiv preprint arXiv:1705.11136 (May 2017).
Wang, et al, "Additive margin softmax for face verification," IEEE Signal Process. Lett., vol. 25, No. 7, pp. 926-930, Jul. 2018.
Wang, et al, "Face search at scale," IEEE Trans. Pattern Anal. Mach. Intell., vol. 39, No. 6, pp. 1122-1136, Jun. 2017.
Wen, et al, "A discriminative feature learning approach for deep face recognition," in Proc. Eur. Conf. Comput. Vis., 2016, pp. 499-515.
Wong, et al, "Patch-based probabilistic image quality assessment for face selection and improved video-based face recognition," in Proc. IEEE Comput. Soc. Conf. Comput. Vis. Pattern Recognit. Workshops, 2011, pp. 74-81.
Yang, et al, "Weakly-supervised disentangling with recurrent transformations for 3D view synthesis," in Proc. 28th Int. Conf. Neural Inf. Process. Syst., 2015, pp. 1099-1107.
Yi, et al. "Learning face representation from scratch," arXiv:1411.7923, 2014.
Yim, et al, "Rotating your face using multi-task deep neural network," in Proc. IEEE Conf. Comput. Vis. Pattern Recognit., 2015, pp. 676-684.
Yin et al, "Multi-task convolutional neural network for face recognition," IEEE Trans. Image Process., vol. 27, No. 2, pp. 964-975, Feb. 2018.
Yin, et al, "Towards large-pose face frontalization in the wild," in Proc. IEEE Int. Conf. Comput. Vis., 2017, pp. 4010-4019.
Yu et al, "Ultra-resolving face images by discriminative generative networks," in Proc. Eur. Conf. Comput. Vis., 2016, pp. 318-333.
Zhang, M. et al, "Random faces guided sparse many-to-one encoder for pose-invariant face recognition," in Proc. IEEE Int. Conf. Comput. Vis., 2013, pp. 2416-2423.
Zhu, et al, "Deep learning identity-preserving face space," in Proc. IEEE Int. Conf. Comput. Vis., 2013, pp. 113-120.
Zhu, et al, "Face Alignment Across Large Poses: A 3D Solution," in CVPR 2016.
Zhu, et al, "High-fidelity pose and expression normalization for face recognition in the wild," in Proc. IEEE Conf. Comput. Vis. Pattern Recognit., 2015, pp. 787-796.
Zhu, et al, "Multi-view perceptron: A deep model for learning face identity and view representations," in Proc. Int. Conf. Neural Inf. Process. Syst., 2014, pp. 217-225.

* cited by examiner

DISENTANGLED REPRESENTATION LEARNING GENERATIVE ADVERSARIAL NETWORK FOR POSE-INVARIANT FACE RECOGNITION

CROSS REFERENCE TO RELATED APPLICATIONS

This application is based upon, claims priority to, and incorporates herein by reference in their entirety international patent application no. PCT/US2018/051552 filed on Sep. 18, 2018, and U.S. Patent Application Ser. No. 62/560,001 filed on Sep. 18, 2017, both of which are entitled "DISENTANGLED REPRESENTATION LEARNING GENERATIVE ADVERSARIAL NETWORK FOR POSE-INVARIANT FACE RECOGNITION."

STATEMENT REGARDING FEDERALLY SPONSORED RESEARCH

This invention was made with government support under HM0476-15-1-0001 awarded by the National Geospatial-Intelligence Agency. The government has certain rights in the invention.

BACKGROUND

The present disclosure generally relates to face recognition technology. More specifically, the present disclosure is directed to systems and methods utilizing a generative adversarial network ("GAN") approach for face recognition.

Face recognition is one of the most widely studied topics in computer vision. However, large pose discrepancy between different face images is one of the key challenges for achieving accurate face recognition. To address these challenges, recent approaches have attempted to utilize deep learning (DL) algorithms for face recognition applications. However, pose-invariant face recognition (PIFR) remains an unsolved problem despite such attempts. For instance, a recent study showed that the performance of most DL algorithms degrades by more than 10% from frontal-frontal to frontal-profile face verification, while human performance is only slightly worse. This indicates that facial pose variation among images (e.g., two pictures of the same person) is indeed a significant, long-felt challenge and obstacle to usability of facial recognition software on real world or "uncontrolled" image sets.

To date, PIFR algorithms can be grouped into two categories. The first category often begins with synthesizing frontal-pose face images from non-frontal images. The synthesized images are then used with standard face recognition methods optimized for frontal-pose images only. However, generating synthetic frontal-pose images from large-pose images remains challenging due to self-occlusion, and other difficulties. Nevertheless, the ability to generate realistic frontal faces and accurately recognize subjects would be beneficial in many biometric applications, including identifying suspects or witnesses in law enforcement.

In attempts to generate realistic frontal-pose images, a variety techniques have been developed. For instance, 3D approaches approximate facial shapes for each queried image using 3D models. Statistical methods apply statistical models to perform joint frontal view reconstruction and landmark localization by solving a constrained low-rank minimization problem. In addition, several deep learning methods have also been developed. For instance, the Multi-View Perceptron has been used to untangle the identity and view representations by processing them with different neurons and maximizing a data log-likelihood. In another example, a multi-task convolutional neural network (CNN) has been used to rotate a face with a given pose and illumination to a target-pose face, followed by a L2 loss-based reconstruction of the input image. Such existing methods frontalize only near-frontal, in-the-wild faces or large, pose-controlled faces. However, practical applications often require analysis of unconstrained images.

A second category of PIFR algorithms relies on learning discriminative features directly from profile facial views, either through one joint model or through multiple pose-specific models. For instance, one approach trains multiple pose-specific models using rendered face images, and each of these multiple representations are then fused. In another approach, a multi-model deep face representation learns features from a set of CNNs, which are then fused via stacked auto-encoders. When multiple test images are available, many of these approaches simply combine the results obtained individually for each of the images. For instance, features are averaged to produce a final representation used for recognition. In addition to such feature-level fusion, most prior work fused results in a distance-metric level. However, the fusion strategy is always predefined and remains the same for any multi-image set. Moreover, feature-based algorithms depend heavily on having good feature representations, which is not always the case.

In light of the above, a need for improved methods for accurate face recognition remains.

SUMMARY

The present disclosure is directed to a system and method for face recognition that overcomes the shortcomings of previous technologies. In particular, a novel approach is described that leverages a Disentangled Representation Learning-Generative Adversarial Network (DR-GAN) framework introduced herein to perform pose-invariant face recognition. As will be described, the present framework can utilize single or multiple as input to learn an identity representation of a subject, as well as perform image synthesis.

In one aspect of the present disclosure, a method for identifying a subject using imaging is provided. The method includes receiving an image depicting a subject to be identified, and applying a trained Disentangled Representation learning-Generative Adversarial Network (DR-GAN) to the image to generate an identity representation of the subject, wherein the DR-GAN comprises a discriminator and a generator having at least one of an encoder and a decoder. The method also includes identifying the subject using the identity representation, and generating a report indicative of the subject identified.

In another aspect of the present disclosure, a system for identifying a subject using imaging is provided. The system includes an input for receiving images depicting a subject to be identified. The system also includes a processor programmed to carry out instructions for processing images received by the input, the instructions comprising applying a trained Disentangled Representation learning-Generative Adversarial Network (DR-GAN) to at least one image to generate an identity representation of the subject, wherein the DR-GAN comprises a discriminator and a generator having at least one of an encoder and a decoder, identifying the subject using the identity representation, and generating a report indicative of the subject identified. The system also includes an output for providing the report.

BRIEF DESCRIPTION OF THE DRAWINGS

The present invention will hereafter be described with reference to the accompanying drawings, wherein like reference numerals denote like elements. The patent or application file contains at least one drawing executed in color. Copies of this patent or patent application publication with color drawing(s) will be provided by the Office upon request and payment of the necessary fee.

DETAILED DESCRIPTION

Figure 1:
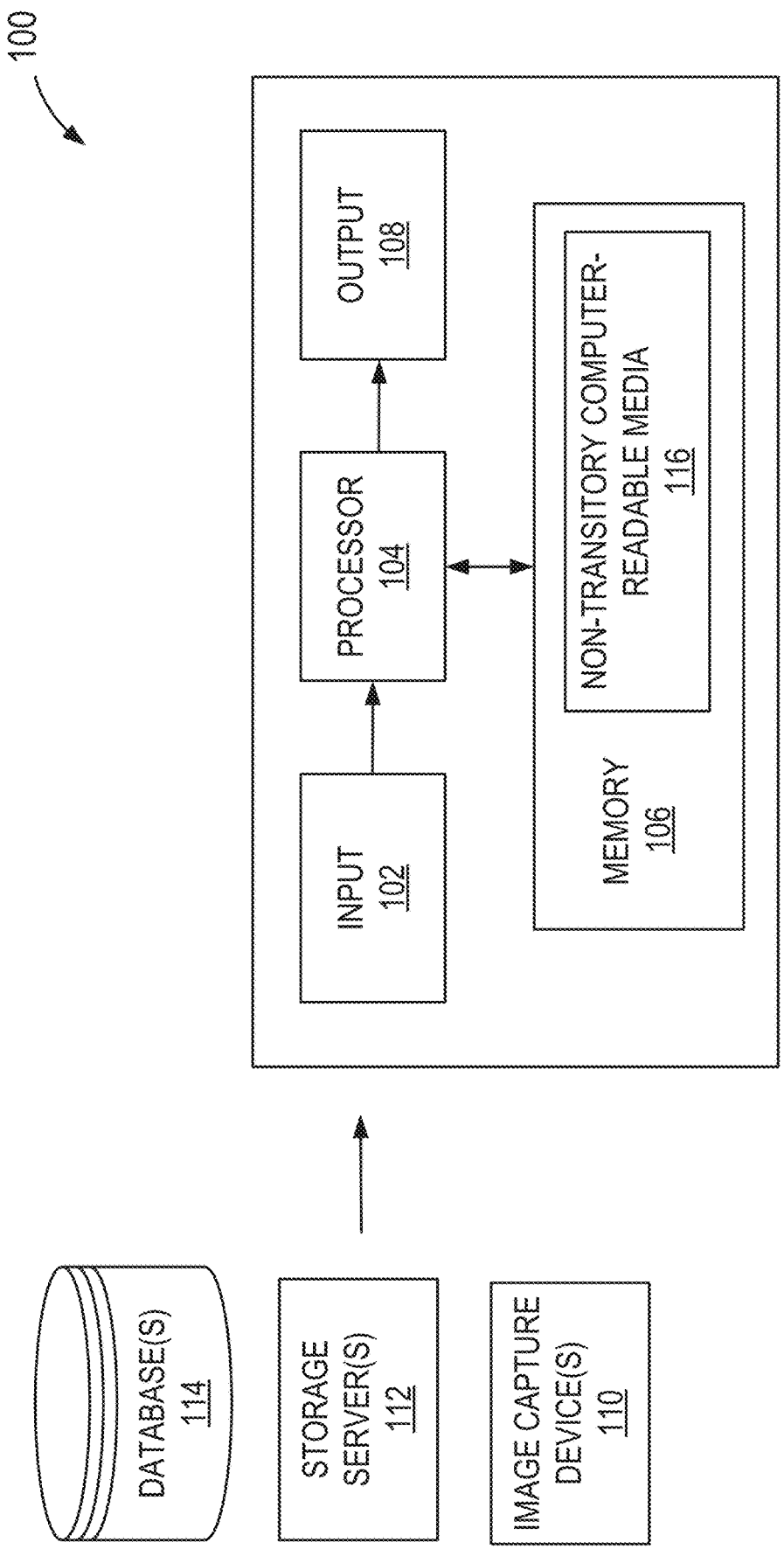
FIG. 1 is a schematic diagram of an example system, in accordance with aspects of the present disclosure.

Many prior face recognition algorithms are designed to perform face formalization on non-frontal face images. Alternatively, other algorithms rely on learned pose-invariant representations to identify a subject. Either way, such conventional approaches are used independently because they are complex and conceptually distinct. In addition, each suffers from various problems and depends heavily on the presence of optimal image conditions in order to work.

Contrary to conventional understanding, the inventors have recognized that certain features of previous techniques may be advantageously, and judiciously combined to provide improved results without their respective drawbacks. Hence, a novel framework for pose-invariant face recognition (PIFR) has been developed, referred to herein as Disentangled Representation learning-Generative Adversarial Network (DR-GAN) framework. In this framework, an identity representation can be produced that is both discriminative and generative. In particular, the generated representation can show superior pose-invariant face recognition performance, and faces of the same identity can be synthesized at target poses specified by pose codes.

Traditionally, Generative Adversarial Networks (GANs) have been used to estimate generative models for image synthesis. Specifically, an adversarial process with a mini-max two-player game involving a generator G and a discriminator D has been used, where G typically takes a random noise vector z to generate synthetic images. Constraints may be incorporated on z, or side information may be leveraged for better synthesis. For example, a class label may be fed to both G and D to generate images conditioned on the class label. In approach, GANs are generalized to learn a discriminative classifier, where D is trained to distinguish between real and fake, and classify the images. In yet another approach, termed InfoGAN, G applies information regularization to the optimization process by using an additional latent code. Despite these efforts, synthesizing high-quality images using GAN has remained problematic.

By contrast, the present DR-GAN framework involves a novel generator G that is constructed with an encoder-decoder structure. As will be described, this offers a number of advantages compared to traditional GANs. For instance, representation learning may be explicitly disentangled using a pose code c. Specifically, the encoder $G_{enc}$ learns a mapping from an input image to a feature representation. The representation may then be concatenated with the pose code and a random noise vector to feed the decoder $G_{dec}$ for face rotation. The input to $G_{enc}$ may be a face image of any pose, while the output of the decoder $G_{dec}$ may be a synthetic face generated at a different pose, where the learned representation bridges $G_{enc}$ and $G_{dec}$.

While G in the present framework serves as a face rotator, D may be trained to not only distinguish between real and synthetic images, but also predict face identity and pose at substantially the same time. With the additional classifications, D strives for a rotated face to have the same identity as the input real face. This approach has two effects on G, namely that the rotated face may look more like the input subject in terms of identity, and the learnt representation may be more inclusive or generative for synthesizing an identity-preserved face.

Moreover, in contrast to existing face recognition algorithms, the present framework may be configured to receive multiple images as input. This is by virtue of $G_{enc}$, which may be trained to take multiple images and produce identity features and a coefficient for each image. Based on the learned coefficients, the features may then be fused or combined into a unified identity representation through one feedforward passing of $G_{enc}$, for instance. The identity representation and pose code, c, can then be used synthesize a face with any target pose desired. In some implementations, an interpolation process may be performed between two pose codes, or two representations in face synthesis. In addition, the present framework can also consider all factors of image quality present in an image dataset, without need for direct supervision. Specifically, for each input image, DR-GAN can generate a coefficient that indicates the quality of the input image.

As appreciated from description below, the adversarial loss approach of the present DR-GAN framework provides a number of advantages that overcome shortcomings of previous techniques. For instance, the present approach can generate high quality synthetic images by identity classification in the discriminator, while fusing the identity features of multiple images based on the learnt coefficients. In addition, realistic face images can be synthesized with any pose. Moreover, the present approach can achieve state-of-the-art performance on image datasets obtained from Multi-PIE, CFP, and IJB-A databases, providing a first demonstration of frontalizing extreme-pose in-the-wild face images. Therefore, the present invention represents a significant improvement the field of face recognition and computer vision.

Although the present disclosure includes description that makes reference to face recognition, it may be readily appreciated that the present approach may be applicable to various computer vision applications, including recognition of other subject features, objects, and so forth.

Turning now to FIG. 1, a block diagram of an example system 100, in accordance with aspects of the present disclosure, is shown. In general, the system 100 may include at least one input 102, processor 104, memory 106, and output 108, and may be configured to carry out steps for face, and other feature or object, recognition, in accordance with aspects of the present disclosure. Although not shown in FIG. 1, the system 100 may also include various communication networks for exchanging data and information between various components of the system 100.

As shown in FIG. 1, the system 100 may communicate with one or more image capture device(s) 110 or cameras, as well as various storage servers 112 or databases 114, by way of a wired or wireless connections or via a communications network. In general, the system 100 may be any device, apparatus or system configured for carrying out instructions for, and may operate as part of, or in collaboration with, various computers, systems, devices, machines, mainframes, networks or servers. In some aspects, the system 100 may be a portable or mobile device, such as a cellular phone or smartphone, laptop, tablet, and the like. In this regard, the system 100 may be a system that is designed to integrate a variety of software and hardware capabilities and functionalities, and may be capable of operating autonomously or semi-autonomously.

Specifically, the input 102 may include different input elements, such as a mouse, keyboard, touchpad, touch screen, buttons, and the like, for receiving various selections and operational instructions from a user. The input 102 may also include various drives and receptacles, such as flash-drives, USB drives, CD/DVD drives, and other computer-readable medium receptacles, for receiving various data and information. To this end, the input 102 may also include various communication ports and modules, such as Ethernet, Bluetooth, or WiFi, for exchanging data and information with various external computers, systems, devices, machines, mainframes, servers or networks.

The processor 104 may include any suitable hardware and components designed or capable of carrying out a variety of processing task. For instance, in some configurations, the processor 104 may include a programmable processor or combination of processors, such as central processing units (CPUs), graphics processing units (GPUs), and the like. As such, the processor 104 may be configured to execute instructions stored in a non-transitory computer readable-media 116. Although the non-transitory computer readable-media 116 is shown in FIG. 1 as included in the memory 106, it may be appreciated that instructions executable by the processor 104 may be additionally or alternatively stored in another data storage location having non-transitory computer readable-media. In some configurations, the processor 104 may also include one or more dedicated processing units or modules that may be configured (e.g. hardwired, or pre-programmed) to carry out steps, in accordance with aspects of the present disclosure.

In addition to being configured to carry out steps for operating the system 100, the processor 104 may also be programmed to carry out steps for identifying at least one subject or object, or features therein, according to methods described herein. To this end, the processor 104 may be configured to apply a trained Disentangled Representation learning-Generative Adversarial Network (DR-GAN) framework to generate an identity representation of the subject using various images. As will be described, the DR-GAN architecture (FIG. 4) may include a discriminator and a generator, where the generator includes a structure comprising a number of encoders and decoders. In some aspects, the processor 104 may also be configured to train the DR-GAN based on various inputted images and information. To this end, various DR-GAN architectures may be produced having any number of convolutional, pooling, exponential linear, fully connected, and layers.

In generating the identity representation, the processor 104 may apply one or more encoders to images received via the input 102. As will be described, the images may depict subjects or objects in various poses, and under various scene settings, such as illumination, elevational angle, and so forth. In some implementations, the processor 104 may be programmed to determine a pose of the subject or object in received images. The processor 104 may then produce one or more feature vectors corresponding to the identity representation. In addition, various feature vectors may be combined by the processor 104, based on learned weights, to produce a combined feature vector. The feature vectors and/or combined feature vector may then be used to identify the subject or object.

In identifying the subject, the processor 104 may compare the identity representation with representations stored in the database 114, the storage server 112, memory 106, or elsewhere. Alternatively, the processor 104 may retrieve images, and input them into one or more encoders of a DR-GAN in order to produce feature vectors for comparison. The processor 104 may then utilize a cosine distance metric, or other similarity metrics, to compare the identified or combined feature vectors with those stored in a database, or generated using images from the database.

In some aspects, the processor 104 may also be programmed to generate synthetic images. To do so, the processor 104 may input the identity representation, along with a noise vector and a target pose code, into the decoder of the DR-GAN. In particular, the target pose code may be determined or selected in accordance with a user specification. In some aspects, a pose of the subject in the synthetic images may be different compared to the pose of the subject in the received images. Specifically, the pose of the subject in a synthetic image may differ by up to 90° from the pose of the subject in a received image. For instance, the processor 104 may produce frontal images using the identity representation, the noise vector and a target pose code indicative of frontal images. The processor 104 may be further programmed to classify generated synthetic images by providing to the discriminator of the DR-GAN.

The processor 104 may also be programmed to generate a report and provide it via the output 108. The report may be in any form and provide various information. In some aspects, the report may indicative of the subject or object, or features therein, identified using DR-GAN. The report may also include various received or generated images, including synthetic images that are generated.

Figure 2:
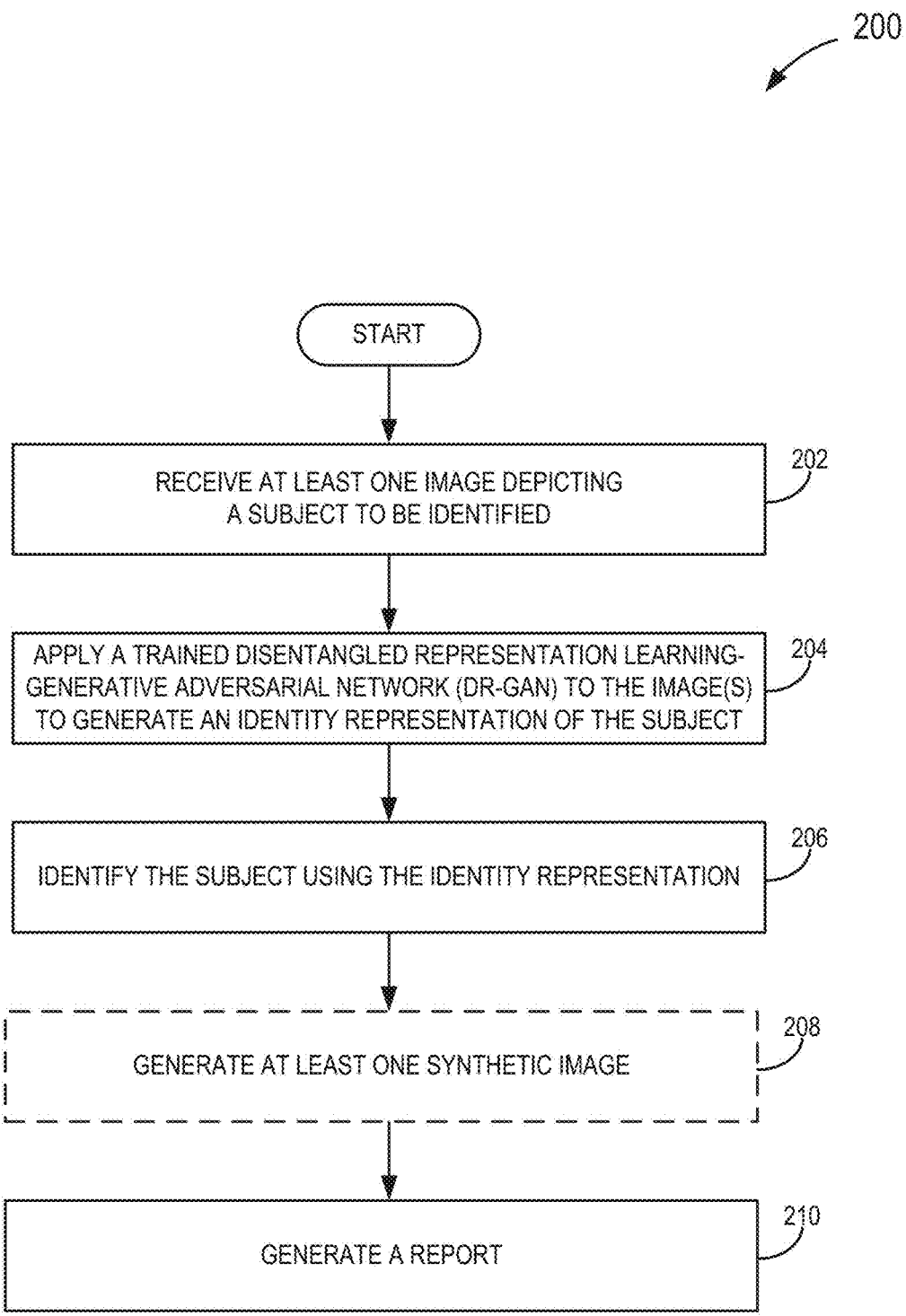
FIG. 2 is a flowchart setting forth steps of a process, in accordance with aspects of the present disclosure.

Referring now to FIG. 2, a flowchart setting forth steps of a process 200, in accordance with aspects of the present disclosure, is shown. Steps of the process 200 may be carried out using any suitable device, apparatus or system, such as systems described herein. Steps of the process 200 may be implemented as a program, firmware, software, or instructions that may be stored in non-transitory computer readable media and executed by a general-purpose, programmable computer, processor or other suitable computing device. In some implementations, steps of the process 200 may also be hardwired in an application-specific computer, processor or dedicated module (e.g. a machine learning module).

As shown, the process 200 may begin at process block 202 with providing images depicting at least one subject to be identified. The imaging may include single or multiple images acquired, for example, using various monitoring devices or cameras. In some implementations, various pre-processing procedures may be applied to the received images, including filtering, enhancing, combining, or separating various features, portions, or components of the images.

Then, at process block 204, a trained DR-GAN may be applied to generate an identity representation of the subject, or object. This step may include extracting the identity representation, in the form of features or feature vectors, by inputting received one or more images into one or more encoders of the DR-GAN. In some aspects, a pose of the subject or object in the received image(s) may be determined at process block 204. In particular, in some aspects, feature vectors obtained from multiple inputted images may be combined to generate a combined feature or feature vector indicative of the identity representation. To do so, the features or feature vectors may be weighted based on learned coefficients.

Figure 3:
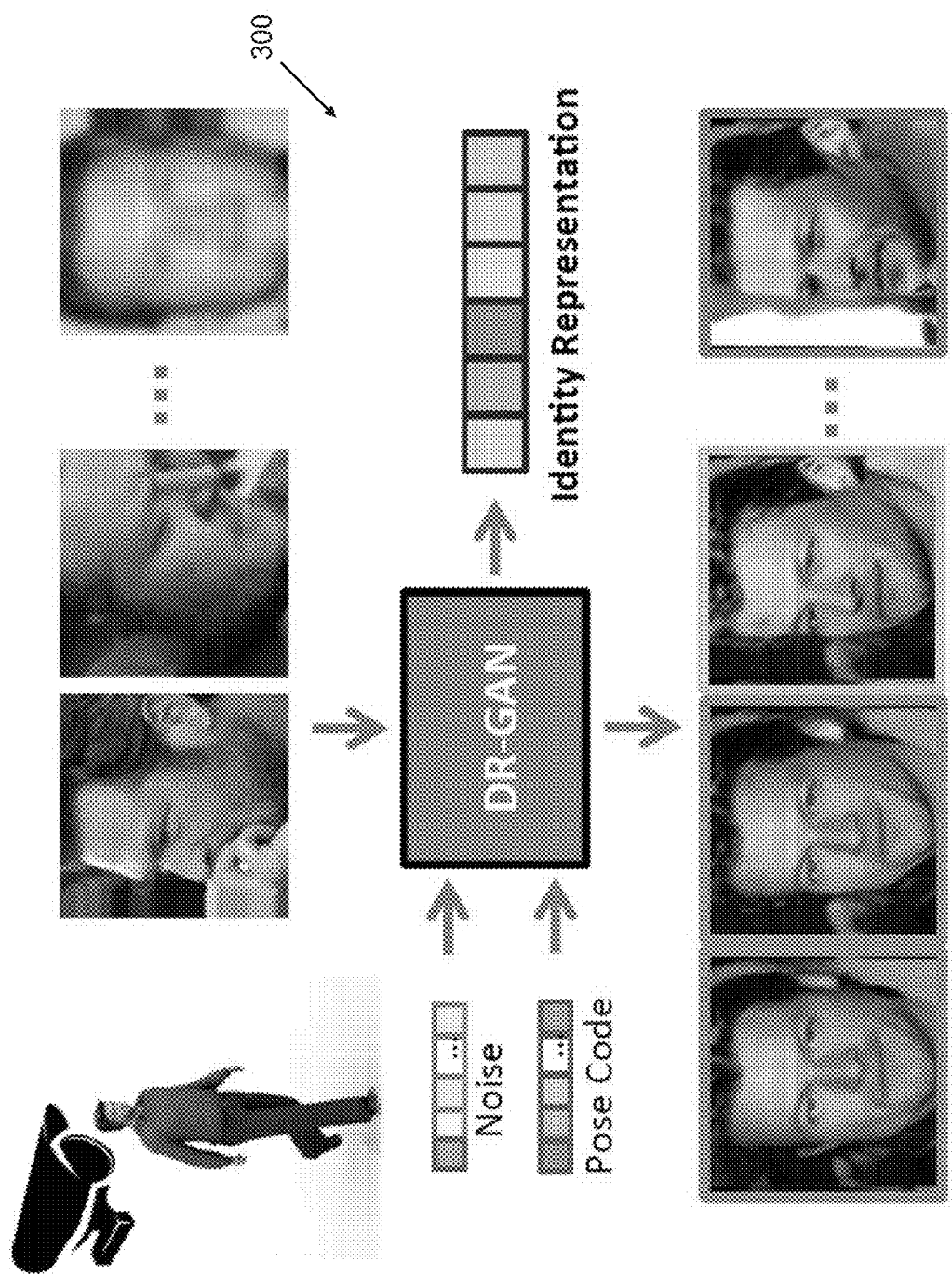
FIG. 3 is an illustration showing a Disentangled Representation Learning-Generative Adversarial Network (DR-GAN) framework for pose-invariant face recognition, in accordance with aspects of the present disclosure.

In some implementations, the discriminator and generator of the DR-GAN may be performed prior to executing process block 204. In addition, the process 200 may also include an optional step of generating synthetic image(s), as indicated process block 208. In particular, synthetic images may be generated by inputting the identity representation identified at process block 206, along with a predetermined noise vector and a target pose code, into the decoder of the DR-GAN. As mentioned, the target pose code may be provided by a user or determined from a user indication. The pose of the subject or object in the synthetic image may be different than the pose in the received image(s). For instance, the received image(s) may show a subject or object's profile while the synthetic images may be frontal images. As appreciated from descriptions below, the present approach allows for synthetic images to have a pose that differs by up to 90° compared the received images. In some aspects, generated synthetic images, along with received images, may be provided at process block 208 to the discriminator of the DR-GAN to perform a classification. This process 200 is visually represented in the DR-GAN framework 300 of FIG. 3.

A report may then be generated, as indicated by process block 210. As mentioned, report may be in any form and provide various information. For instance, the report may indicative of the subject or object identified using the DR-GAN. The report may also include various received or generated images, including synthetic images generated.

Two variations of the present DR-GAN framework will now be described. The first variation can take one image per subject for training, termed single-image DR-GAN, while the second variation can leverage multiple images per subject for both training and testing, termed multi-image DR-GAN. The two types of variations will be discussed in detail below.

A Generative Adversarial Network (GAN), in accordance with one aspect of the present disclosure, may include a generator G and a discriminator D that compete in a two-player minimax game: D tries to distinguish a real image x from a synthetic image G(x), and G tries to fool D by synthesizing realistic-looking images. Concretely, D and G play the game with a value function V(D, G):

$$\min_G \max_D V(D, G) = E_{x \sim p_d(x)}[\log D(x)] + E_{z \sim p_z(z)}[\log(1 - D(G(z)))]. \quad (1)$$

This minimax game has a global optimum when the distribution of the synthetic samples $p_g$, and that of the training samples $p_d$ are the same. Under mild conditions (e.g., G and D have enough capacity), $p_g$ converges to $p_d$. However, at the beginning of training, the samples generated from G are extremely poor and are rejected by D with high confidences. In practice, it may be better for G to maximize log(D(G(z))) instead of minimizing log (1−D(G(z))). As a result, G and D may be trained to optimize the following functions:

$$\max_D V_D(D, G) = E_{x \sim p_d(x)}[\log D(x)] + E_{z \sim p_z(z)}[\log(1 - D(G(z)))], \quad (2)$$

$$\max_G V_G(D, G) = E_{z \sim p_z(z)}[\log(D(G(z)))]. \quad (3)$$

The present single-image DR-GAN will now be described. In particular, single-image DR-GAN has two distinctive novelties related to conventional GANs. First, in addition to the objective of image synthesis an identity representation for a face is learned by using an encoder and decoder network structure, where the representation is the encoder's output and the decoder's input. Since the representation can be passed to the decoder to synthesize various faces of the same subject, it is a generative representation.

Second, in any classification task, there is normally distractive variation existing in an object's appearance. As a result, the representation learned by the encoder might include the distractive side variation. Therefore, in addition to the class labels, additional side information, e.g., pose and illumination information, may be employed to disentangle these variations. In turn, this would help to learn a more discriminative representation.

Figure 4:
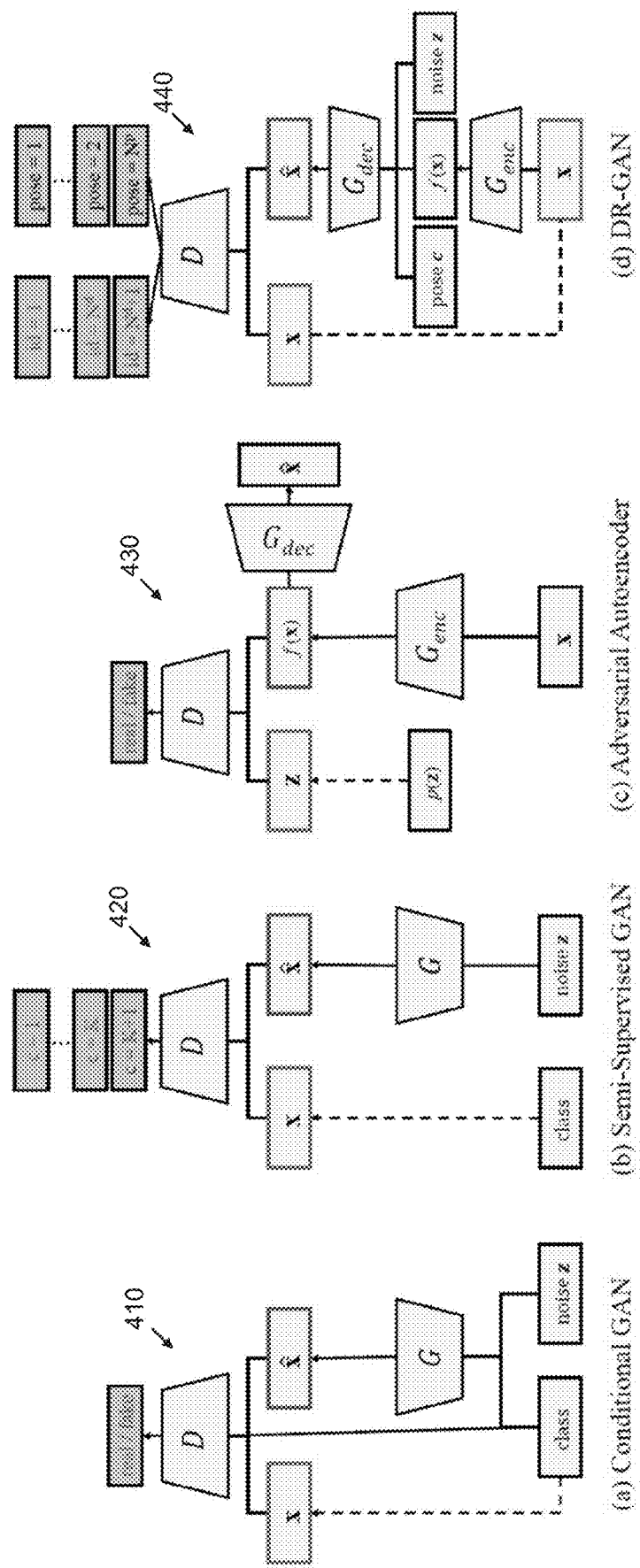
FIG. 4 is an illustration comparing previous Generative Adversarial Network (GAN) structures relative to a DR-GAN structure, in accordance with aspects of the present disclosure.

For any face image x with label y={$y^d, y^p$}, where $y^d$ represents the label for identity and $y^d$ for pose, it may be desired to generate a new face image x with the same identity $y^d$ but a different pose controlled by a pose code c. To do so, a Disentangled Representation learning-Generative Adversarial Network (DR-GAN) conditioned on the original image x and the pose code c may be trained. The network architecture is illustrated in FIG. 4 (d).

Given a real face image x or a synthetic face image $\hat{x}$=G(x,c,z), D estimates the identity and pose of $\hat{x}$, or classifies x̂ as fake. In some aspects, D may include two parts, namely D=[$D^d, D^p$]. Herein, $D^d \in \mathbb{R}^{N^d+1}$ used for identity classification with $N^d$ representing the total number of identities in the training set and the additional dimension is for fake/real classification. $D^p \in \mathbb{R}^{N^p}$ is used for pose classification with $N^p$ denoting the total number of poses. To this end, D may be trained to optimize this objective function, $$\max_D V_D(D, G) = E_{x,y \sim p_d(x,y)}[\log D^d_{y^d}(x) + \log D^p_{y^p}(x)] + \quad (4)$$
$$E_{x,y \sim p_d(x,y), z \sim p_z(z), c \sim p_c(c)}[\log(D^d_{N^d+1}(G(x, c, z)))],$$

where $D_i^d$ and $D_i^p$ are the $i^{th}$ element in $D^d$ and $D^p$. The first term in Eqn. 4 maximizes the probability that x is classified to the true identity $y^d$ and pose $y^p$. The second term maximizes the probability of the synthetic image being classified as a fake class. As shown, G may include two components, namely $G_{enc}$ and $G_{dec}$. In particular, $G_{enc}$ aims to learn an identity representation from a face image x: $f(x)=G_{enc}(x)$. On the other hand, $G_{dec}$ aims to synthesize a face image $\hat{x}=G_{dec}(f(x),c,z)$ with identity $y^d$ and a target pose specified by c. Here, z is the noise parameter used to model variance other than identity and pose. The pose code may be a one-hot vector $c \in \mathbb{R}^{N^p}$ with only the target pose $y^t$ being 1. The goal of G is to fool D to classify x̂ to the corresponding identity and the target pose class. The objective function for learning G is defined as:

$$\max_G V_G(D, G) = \quad (5)$$
$$E_{x,y \sim p_d(x,y), z \sim p_z(z), c \sim p_c(c)}[\log(D^d_{y^d}(G(x, c, z))) + \log(D^p_{y^t}(G(x, c, z)))].$$

G and D may improve each other during training. In particular, with D being more powerful in distinguishing between fake relative to real images, G may be trained to learn more discriminative identity representation in order to synthesize an identity-preserved face with the correct target pose to compete with D. This process has two beneficial aspects. First, the learnt representation f(x) preserves more discriminative information of the input identity. Second, the pose classification in D also guides the face rotation process to be more accurate. Furthermore, with separated pose code, f(x) can disentangle the pose variation. Therefore, f(x) is not only discriminative for PIFR, but also generative for image synthesis.

In order to optimize the objective functions, two CNN architectures may be utilized to serve each objective, respectively. To this end, various convolutional, pooling, and fully connected layers may be utilized. In some implementations, CASIA-NET may be adopted for $G_{enc}$ and D, where batch normalization (BN) and exponential linear unit (ELU) layers may be applied after each convolution layer. In one example, the discriminator D may have a CNN structure with multiple convolution, BN, ReLU layers, and fully connected layers. In particular, D may be trained to optimize Eqn. 4, by defining the softmax loss for $N^d+1$ and $N^p$ classes for identity and pose, respectively. On the other hand, G includes an encoder $G_{enc}$ and a decoder $G_{dec}$, bridged by a to-be-learned feature representation f(x). In the encoding stage, several layers of convolution with BN may performed, followed by ReLU. When the spatial dimension of the feature maps is $6 \times 6 \times N_f$, a global spatial average on each channel may be performed to create a feature representation $f(x) \in \mathbb{R}^{N_f}$. In addition, f(x) may be concatenated with an one-hot pose code $c \in \mathbb{R}^{N^p}$ and a random noise vector $z \in \mathbb{R}^{N^z}$.

The concatenated features may then be provided as input to $G_{dec}$, i.e., a small spatial extent convolutional representation with many feature maps. A series of fractionally-strided convolutions (FConv) can then transform the features into a synthetic image $\hat{x}=G(x,c,z)$, which is of the same size as the input image x. G may then be then trained to maximize Eqn. 5 when a synthetic image x̂ is fed to D and the gradient may be back-propagated to update G. By way of example, details of a network structure, in accordance with aspects of the disclosure, are presented in Table 1. In some aspects, as shown in the table, additional elements may be added to learn coefficients for multi-image DR-GAN.

TABLE 1

The structures of $G_{enc}$, $G_{dec}$ and D networks in single-image and multi-image DR-GAN.

| $G_{enc}$ and D | | | $G_{dec}$ | | |
|---|---|---|---|---|---|
| Layer | Filter/Stride | Output Size | Layer | Filter/Stride | Output Size |
| | | | FC | | 6 × 6 × 320 |
| Conv11 | 3 × 3/1 | 96 × 96 × 32 | FConv52 | 3 × 3/1 | 6 × 6 × 160 |
| Conv12 | 3 × 3/1 | 96 × 96 × 64 | FConv51 | 3 × 3/1 | 6 × 6 × 256 |
| Conv21 | 3 × 3/2 | 48 × 48 × 64 | FConv43 | 3 × 3/2 | 12 × 12 × 256 |
| Conv22 | 3 × 3/1 | 48 × 48 × 64 | FConv42 | 3 × 3/1 | 12 × 12 × 128 |
| Conv23 | 3 × 3/1 | 48 × 48 × 128 | FConv41 | 3 × 3/1 | 12 × 12 × 192 |
| Conv31 | 3 × 3/2 | 24 × 24 × 128 | FConv33 | 3 × 3/2 | 24 × 24 × 192 |
| Conv32 | 3 × 3/1 | 24 × 24 × 96 | FConv32 | 3 × 3/1 | 24 × 24 × 96 |
| Conv33 | 3 × 3/1 | 24 × 24 × 192 | FConv31 | 3 × 3/1 | 24 × 24 × 128 |
| Conv41 | 3 × 3/2 | 12 × 12 × 192 | FConv23 | 3 × 3/2 | 48 × 48 × 128 |
| Conv42 | 3 × 3/1 | 12 × 12 × 128 | FConv22 | 3 × 3/1 | 48 × 48 × 64 |
| Conv43 | 3 × 3/1 | 12 × 12 × 256 | FConv21 | 3 × 3/1 | 48 × 48 × 64 |
| Conv51 | 3 × 3/2 | 6 × 6 × 256 | FConv13 | 3 × 3/2 | 96 × 96 × 64 |
| Conv52 | 3 × 3/1 | 6 × 6 × 160 | FConv12 | 3 × 3/1 | 96 × 96 × 32 |
| Conv53 | 3 × 3/1 | 6 × 6 × ($N^t$ + 1) | FConv11 | 3 × 3/1 | 96 × 96 × 1 |
| AvgPool | 6 × 6/1 | 1 × 1 × ($N^t$ + 1) | | | |
| FC (D only) | | $N^d + N^p + 1$ | | | |

With a single-image DR-GAN, an identity representation f(x) can be extracted from a single image x, and different faces of the same person, in any pose, can be generated. In practice, a number of images may often be available, for instance, from video feeds provided by different cameras capturing a person with different poses, expressions, and under different lighting conditions. However, although using multiple images is understood as being able to improve face recognition, existing methods are limited to combining results from single-image analyses. Similarly, face synthesis techniques, e.g., face frontalization, are constructed to utilize one image as input. Therefore, there is a lack of a unified and integrated approach to consume multiple images for both representation learning and image synthesis.

Figure 5:
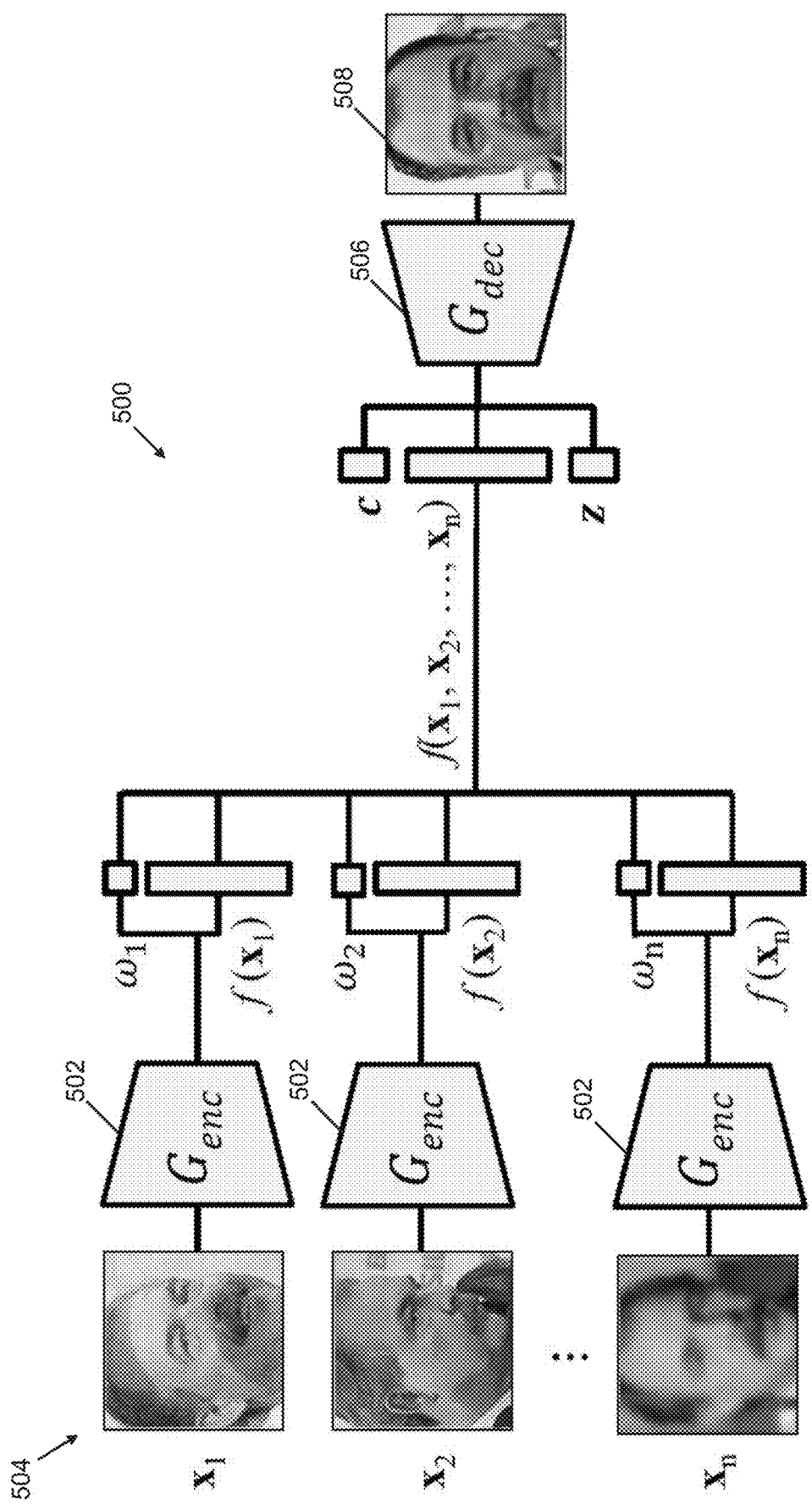
FIG. 5 shows an example generator structure, in accordance with aspects of the present disclosure, the structure fusing features obtained from multiple images of a person into a single representation via dynamically learnt coefficients.

To address this gap, a multi-image DR-GAN is herein provided. Compared to the single-image DR-GAN, the multi-image DR-GAN may include a similar discriminator D, and a modified generator G. As shown in the illustration of FIG. 5, the modified generator 500 ("G') may include a number of $G_{enc}$ 502, each corresponding to an image in the multi-image data set 504. In addition to extracting features f(x), each $G_{enc}$ 502 can also estimate a confidence coefficient ω, which predicts the quality of the learnt representation. With n input images $\{x_i\}_{i=1}^n$ the fused representation may then be expressed as weighted average of all representations, as follows:

$$f(x_1, x_2, \ldots, x_n) = \frac{\sum_{i=1}^{n} \omega_i f(x_i)}{\sum_{i=1}^{n} \omega_i}. \quad (6)$$

The coefficients $\omega_i$ in Eqn. 6 may be learned and depend upon the provided images. For instance, values of $\omega_i$ may be such that images with high confidences contribute more to the fused features. The final representation may then be concatenated with the pose code c and the noise z and fed to the $G_{dec}$ 506 to generate a new image 508.

Using this structure, the generated image 508 may then be expected to substantially share the same identity with the images in the multi-image data set 504. Thus, the objective function for learning G has a total of 2 (n+1) terms to maximize:

$$\max_G V_G(D, G) = \sum_{i=1}^{n} \left[ E_{x_i, y_i \sim p_d(x,y), z \sim p_z(z), c \sim p_c(c)} \right. \quad (7)$$
$$\left[ \log(D_{y^d}^d(G(x_i, c, z))) + \log(D_{y^p}^p(G(x_i, c, z))) \right] +$$
$$E_{x_i, y_i \sim p_d(x,y), z \sim p_z(z), c \sim p_c(c)} \left[ \log(D_{y^d}^d(G(x_1, \ldots, x_n, c, z))) + \right.$$
$$\left. \log(D_{y^p}^p(G(x_1, \ldots, x_n, c, z))) \right].$$

It may be noted that jointly training multiple images per subject may still result in one generator G rather than multiple generators. As shown in FIG. 5, all generators may share the same parameters. However, G may be more effective due to the extra constraints from multiple images, and can be utilized for testing in two ways. First, with multiple test images per subject, these can be fed to $G_{enc}$ 502 and their representations fused in accordance with Eqn. 6, where $f(x_1, x_2, \ldots, x_n)$ can further synthesize images using $G_{dec}$ 506. Second, with only one test image, G can be used the same way as the single-image DR-GAN, and ω can be ignored.

With respect to the network structure, the multi-image DR-GAN may be slightly modified compared to the single-image DR-GAN. Specifically, at the end of $G_{enc}$ one more convolution channel may be added to the layer right before global average pooling, to estimate the confidence coefficient ω. A Sigmoid activation can be applied to keep ω in the range of (0, 1). In some aspects, the number n of input images per subject during training can be kept the same for the sake of convenience in image sampling and feeding tensors through the network. To mimic the variation in the number of input images, a simple but effective trick can be used, namely applying drop-out on the confidence coefficient ω. Hence, during training, the network can take any number of inputs from 1 to n. The testing stage can be hence more flexible, where the network handles an arbitrary number of test images.

In some aspects, the loss function described above may be reformulated such that instead of having an extra element indicate the fake class in the identification task, as described, it may now be split into two separate tasks, namely real/synthetic and identify classification, as described below. Such reformulation may help overcome imbalance in training samples.

Specifically, D may be a multi-task CNN consisting of three components: $D=[D^r, D^d, D^p]$. Herein, $D^r \in \mathbb{R}^1$ is for real/fake image classification, $D^d \in \mathbb{R}^{N^d}$ is for identity classification with $N^d$ as the total number of subjects in the training set. $D^p \in \mathbb{R}^{N^p}$ is for pose classification with $N^p$ as the total number of discrete poses. Note that if $D^r$ is implemented as an additional $N^d+1^{th}$ element of $D^d$, a problem of unbalanced training data may arise for each dimension in $D^d$, i.e., the number of synthetic images ($N^d+1^{th}$ dimension) equals to the summation of all images in the real classes (the first $N^d$ dimensions). By way of splitting into two separate tasks, this problem may be overcome. As such, given a face image x, D aims to classify it as the real image class, and estimate its identity and pose; while given a synthetic face image from the generator $\tilde{x}=G(x,c,z)$, D attempts to classify $\tilde{x}$ as fake, using the following objectives:

$$\mathcal{L}_{gan}^D = \mathbb{E}_{x_i, y_i \sim p_d(x,y)}[\log D^r(x)] +$$

$$\mathcal{L}_{id}^D = \mathbb{E}_{x,y \sim p_d(x,y)}[\log D_{y^d}^d(x)], \quad (9)$$

$$\mathcal{L}_{pos}^D = \mathbb{E}_{x,y \sim p_d(x,y)}[\log D_{y^p}^p(x)], \quad (10)$$

$D_i^d$ and $D_i^p$ are the ith element in $D^d$ and $D^p$. For clarity, subscripts may be omitted for expected value notations, as all random variables are sampled from their respect distributions (x,y~$p_d$(x,y),z~$p_z$(z), c~$p_c$(c)). A final or combined objective for training D may be a weighted average of the objectives above, namely:

$$\max_D \mathcal{L}^D = \lambda_g \mathcal{L}_{gan}^D + \lambda_d \mathcal{L}_{id}^D + \lambda_p \mathcal{L}_{pas}^D, \quad (11)$$

As described, G may include two components, namely $G_{enc}$ and $G_{dec}$. The objective functions may then be writte as:

$$\mathcal{L}_{gan}^D = \mathbb{E}[\log D^r(G(x,c,z))], \quad (12)$$

$$\mathcal{L}_{id}^D = \mathbb{E}[\log D_y^d(G(x,c,z))], \quad (13)$$

$$\mathcal{L}_{pos}^D = \mathbb{E}[\log D_y^p(G(x,c,z))], \quad (14)$$

Similarly, the final or combined objective for training the discriminator G may then be a weighted average of each objective, namely:

$$\max_G \mathcal{L}^G = \mu_g \mathcal{L}_{gan}^G + \mu_d \mathcal{L}_{id}^G + \mu_p \mathcal{L}_{pos}^G, \quad (15)$$

where, in some aspects, the weights may be set as $\mu_g = \mu_d = \mu_p = 1$.

G and D may improve each other during the alternative training process. With D being more powerful in distinguishing real versus fake images and classifying poses, G strives for synthesizing an identity-preserving face with the target pose to compete with D. Three benefits may be obtained from this approach. First, the learnt representation f(x) can preserve more discriminative identity information. Second, the pose classification in D guides the pose of the rated face to be more accurate. Third, with a separate pose code as input to $G_{dec}$, $G_{enc}$ may be trained to disentangle the pose variation from f(x). That is, f(x) encodes as much identity information as possible, but using as little pose information as possible. Therefore, f(x) is not only generative for image synthesis, but also discriminative for face recognition.

As described, DR-GAN aims to learn a disentangled representation for PIFR. Specifically, $G_{enc}$ aims for identity representation learning. While $D^d$ aims for identity classification, it also learns an identity representation that could be used for face recognition during testing. The fact that both $G_{enc}$ and $D^d$ can be used for face recognition brings two questions explored herein. The first is whether $G_{enc}$ can outperform $D^d$. The second is whether a better $D^d$ can lead to a better $G_{enc}$ in representation learning.

To answer these questions, a bounding experiment was performed. Specifically, using the Multi-PIE training sent, a single-task CNN-based recognition model was trained for 20 epochs. The models were saved at 5th, 10th, 15th, and 20th epochs, termed $D_5^d$, $D_{10}^d$, $D_{15}^d$, and $D_{20}^d$, respectively. These found models can be used as $D^d$ and to train four single-image DR-GAN models. Each model is trained until converged, where G is updated with $D^d$ being fixed, leading to four $G_{enc}$ termed $G_{enc}^5$, $G_{enc}^{10}$, $G_{enc}^{15}$, and $G_{enc}^{20}$, respectively.

Figure 6:
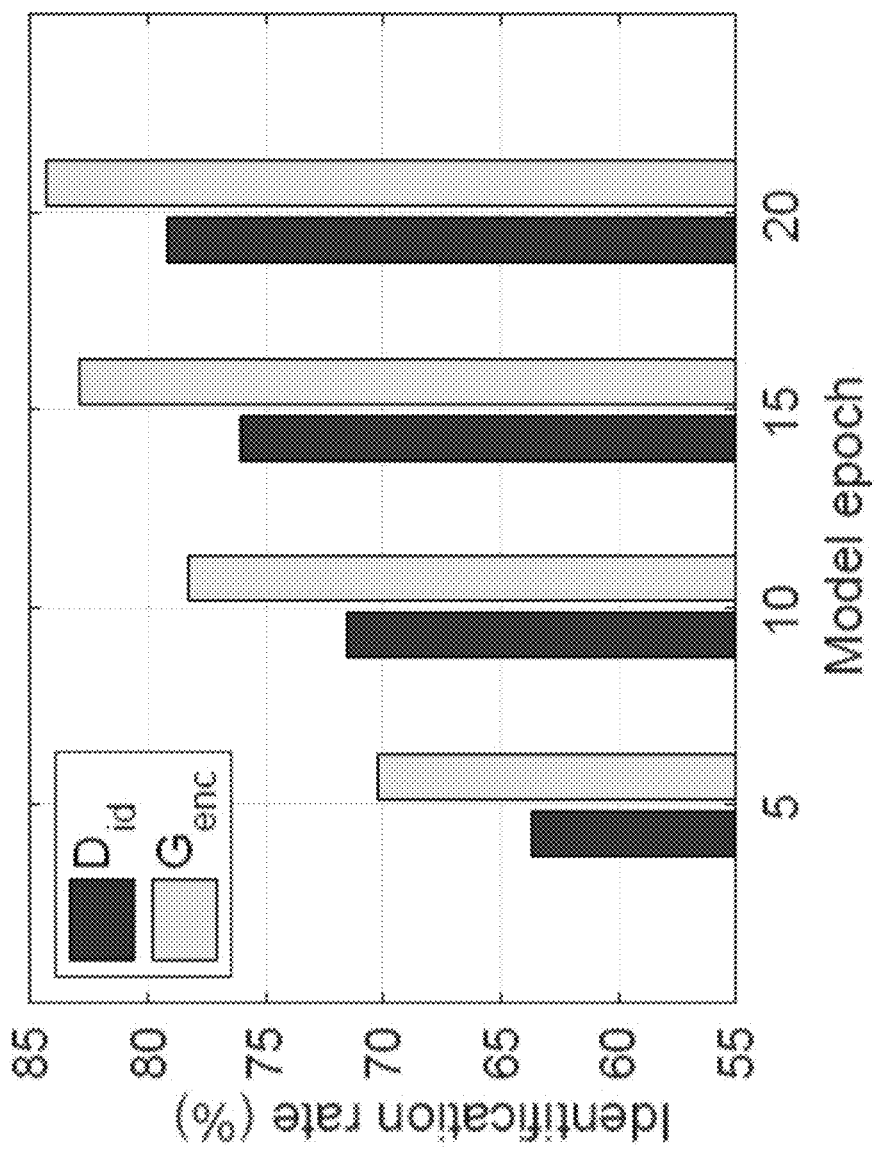
FIG. 6 is an example graph illustrating recognition performance using methods in accordance with aspects of the present disclosure.

Both $G_{enc}$ and $D^d$ were used to extract identity features for face recognition on Multi-PIE, with results shown in FIG. 6. From the results, three observations can be made. First, the performance of $D^d$ shows that $D_5^d < D_{10}^d < D_{15}^d < D_{20}^d$. This is because the performance increases as the model is being trained for more epochs. Second, the performance of $G_{enc}$ also shows a similar trend, with $G_{enc}^5 < G_{enc}^{10} < G_{enc}^{15} < G_{enc}^{20}$, which indicates that a better $D^d$ indeed can lead to a better $G_{enc}$. Third, $G_{enc}$ is shown to consistently outperform $D^d$, which suggests that the learn representation in $G_{enc}$ is more discriminative than the representation in conventional CNN-based face recognition models.

Based on these observations, an iterative scheme may be used to switch between $G_{enc}$ and $D^d$ in order to further improve $G_{enc}$. In some aspects, $G_{enc}$ and $D^d$ may share the same network structure except that $G_{enc}$ can have an additional convolution filter for the coefficient estimation. During training, $D^d$ may be iteratively replaced with the latest $G_{enc}$ by removing the additional convolution filter after several epochs. Since $G_{enc}$ may consistently outperform $D^d$, a better $D^d$ would then be expected after model switch.

Moreover, a better $D^d$ can lead to a better $G_{enc}$, which may often be used as $D^d$ for a next switch. This iterative switch approach can therefore lead to better representations and thus better PIFR performance.

As described, $G_{enc}$ learns a mapping from the image space to a representation space and $G_{dec}$ learns the mapping from representation space to the image space. Specifically, $G_{enc}$ is important for PIFR while $G_{dec}$ is important for face synthesis. The usage of pose code, random noise, as well as the model switch techniques described may be useful for learning a better disentangled representation for $G_{enc}$. However, even with a perfect representation from $G_{enc}$, having a poor $G_{dec}$ may synthesize unsatisfactory face images.

Therefore, to learn a better $G_{dec}$, a representation interpolation regularizing the learning process may be employed. It is recognized that interpolation between two noise vectors can still produce a valid image. Therefore, assuming a convex identity space, the interpolation between two representations $f(x1), f(x2)$ extracted from the face images $x_1$ and $x_2$ of two different identities can still be a valid face, but with an unknown identity. During training, images with different identities may be randomly paired to generate an interpolated representation using weights, as follows:

$$f_\alpha(x_1, x_2) = \alpha f(x_1) + (1-\alpha) f(x_2). \quad (16)$$

In some aspects, an average $f_{1/2}$ may be used for the sake of simplicity. However it is recognized that other weights may be used for combining the two face representations. Similar to the objects of G and D in multi-image DR-GAN, there are additional terms to regularize the averaged, or weighted, representation. D aims to classify the generated image to the fake class by having the following extra term:

$$\mathbb{E}\left[\log\left(1 - D^r\left(G_{dec}\left(f_{\frac{1}{2}}(x_1, x_2), c, z\right)\right)\right)\right]. \quad (17)$$

And G aims to generate an image that can fool D to classify it as the real class and the target pose, and ignore the identity part, with two additional terms $\mathcal{L}_{gan}^G$ in $\mathcal{L}_{pos}^G$:

$$\mathbb{E}\left[\log\left(D^r\left(G_{dec}\left(f_{\frac{1}{2}}(x_1, x_2), c, z\right)\right)\right)\right]. \quad (18)$$

$$\mathbb{E}\left[\log\left(D_{y^t}^p\left(G_{dec}\left(f_{\frac{1}{2}}(x_1, x_2), c, z\right)\right)\right)\right]. \quad (19)$$

The above described techniques for improving $G_{enc}$ and $G_{dec}$ may then result in the ability to generalize DR-GAN for both representation learning and image synthesis, resulting in improved performed.

To illustrate the advantages of the present disclosure, the structure of the present DR-GAN framework is now compared to those from previous GAN-based approaches. Referring again to FIG. 4, the conditional GAN 410 (FIG. 4 (*a*)), the semi-supervised GAN 420 (FIG. 4 (*b*)), and the adversarial autoencoder 430 (FIG. 4 (*c*)) are compared to the single-image DR-GAN 440 of the present disclosure.

First, the conditional GAN 410 extends the traditional GAN by feeding the labels to both G and D to generate images conditioned on the label. The label can be the c class labels, modality information, or even partial data for inpainting. It has been used to generate MNTST digits conditioned on the class label and to learn multi-modal models. In conditional GAN, D is trained to classify a real image with mismatched conditions to a fake one. By contrast, in the present DR-GAN 440, a real image to the corresponding class based on the labels.

Second, GANs were previously generalized to learn a discriminative classifier, where the D is trained to not only distinguish between real and fake images, but also to classify the real images into K different classes. D outputs a (K+1)-dim vector with the last dimension being the real/fake decision. The trained D is used for image classifications. The present DR-GAN 440 share similar loss with for D with two additions. First, G is expanded with an encoder and decoder structure for image synthesis. Second, additional side information classification on the face pose is included while training the D.

Third, in Adversarial Autoencoder (AAE) techniques, G is the encoder part of an autoencoder. AAE 430 has two objectives in order to turn an autoencoder into a generative model. First, the autoencoder reconstructs the input image. Second, the latent vector generated by the encoder is learned to match an arbitrary prior distribution by training D. The present DR-GAN 440 approach differs from AAE 430 in two ways. First, the autoencoder in AAE 430 is trained to learn a latent representation similar to an imposed prior distribution. By contrast, the present encoder-decoder structure is configured to learn more a discriminative identity representation. Second, the D in AAE 430 is only trained to distinguish between real and fake images, while D in the present approach is trained to classify identity and pose in addition to the real/fake decision.

To demonstrate the innovative features of the present approach, images from multi-PIE database, which includes the largest dataset available for evaluating face recognition under pose, illumination, and expression variations in controlled environment, were analyzed. In this study, images from 337 subjects with neutral expression were used. Of these, nine poses were within ±60°, and 20 illuminations. The first 200 subjects are used for training and the rest 137 for testing. In testing, the gallery includes one image per subject with frontal view and illumination. The rest images were the probes. For Multi-PIE experiments, an additional illumination code similar to the pose code was added to disentangle illumination variation. As such, $N^d=200$, $N^p=9$, and $N^{il}=20$.

For the unconstrained setting, models were trained using CASIA-WebFace, AFLW and Multi-PIE, and tested on Celebrities in Frontal-Profile (CFP) and IJB-A datasets. CASIA-WebFace includes 494, 414 images of 10, 575 subjects, which is biased to near-frontal faces. Multi-PIE and CASIA-WebFace were combined to include more pose variations. AFLW (25,993 images) was added to the training set to supply more pose variation. CFP was introduced to address the large-pose face verification. It included 500 subjects each with 10 frontal and 4 profile images. The evaluation protocol included frontal-frontal (FF) and frontal-profile (FP) face verification. Each of them consisted of 10 folders with 350 same-person pairs and 350 different-person pairs. As another large-pose database, IJB-A includes 5, 396 images and 20, 412 video frames for 500 subjects. It defines template-to-template face recognition where each template has one or multiple images. About 27 overlap subjects were removed between the CASIA-Webface and IJB-A from training. Hence $N^d=10,885$ and $N^p=13$. For both settings, $N^f=320$ and $N^z=50$.

Figure 7:
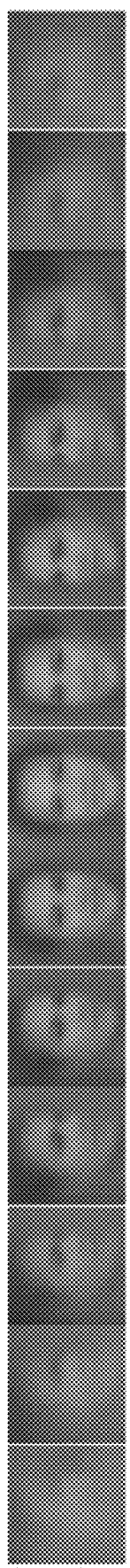
FIG. 7 shows example images depicting mean faces for multiple pose groups obtained using a CASIA-Webface dataset, in accordance with aspects of the present disclosure.

All face images were aligned to a canonical view of size 100×100, or 110×110, based on two landmarks. Regions of 96×96 were randomly sampled from the aligned face images for data augmentation. Image intensities were linearly scaled to the range of [−1,1]. To provide pose labels $y^p$ for CASIA-WebFace, 3D face alignment was applied to classify each face to one of 13 poses. The mean face image for each pose group in CASIA-Webface is shown in FIG. 7. As appreciated from the figure, the profile faces are less sharp compared to near-frontal faces, indicative of pose estimation error by the face alignment algorithm.

Following previous optimization strategies, all models were trained with a batch size of 64. All weights were initialized from a zero-centered normal distribution with a standard deviation of 0.02. An Adam optimizer was used with a learning rate of 0.0002 and momentum 0.5. Similar to conventional GANs, it is advantageous to alternate between k (usually k=1) steps for optimizing D and one step of optimizing G. This helps D maintain near-optimal solution as long as G changes slowly. However, in DR-GAN, D has strong supervisions due to the class labels. Thus, in later iterations, when D is close to the optimal solution, G can be updated more frequently than D, e.g., 4 steps of optimizing G and 1 for D.

As described, the present DR-GAN framework can achieve both face representation learning and face image synthesis. Therefore, in some aspects, a disentangled representation as identity features was used for face recognition using a cosine-distance metric. The performance of face recognition with respect to different number of images was also used in both training and testing. For image synthesis, qualitative results are shown by comparing different losses and interpolation of the learnt representations.

The effect of the number of training images (n) per subject was evaluated with respect to face recognition performance. Three models were trained using different numbers of input images per subject: n=1, 4, 6, with n=1 associated with the single-image DR-GAN, and n>1 associated with multi-image DR-GAN. The testing performances on CFP using f(x) of each model is shown in Table 2. These results demonstrate the advantage of training with multi-image DR-GAN over the single-image counterpart. Namely, training with multiple images per subject not only enhances the model's ability to handle multiple test images, but also applies more constraints to model the learning process, which leads to a better representation. Herein, n=6 was used for multi-image DR-GAN. As may appreciated, a higher number of images may be used depending upon the computational capacity available.

TABLE 2

Comparison of single vs. multi-image DR-GAN on CFP.

| Method | Frontal-Frontal | Frontal-Profile |
|---|---|---|
| DR-GAN: n = 1 | 97.13 ± 0.68 | 90.82 ± 0.28 |
| DR-GAN: n = 4 | 97.86 ± 0.75 | 92.93 ± 1.39 |
| DR-GAN: n = 6 | 97.84 ± 0.79 | 93.41 ± 1.17 |

The effect of the number of testing images ($n_t$) per subject on face recognition performance was also evaluated using Multi-PIE. The IJB-A was mimicked to generate image sets as the probes for face recognition while the gallery set remained the same with one image per subject. From the Multi-PIE probe set, a subset $\mathbb{P}_0$ of images with large poses (absolute pose in the range 30° to 60°) was selected to form 5 different probe sets $\{\mathbb{P}_i\}_{i=1}^5$. Then, one image was randomly selected from $\mathbb{P}_0$ to form $\mathbb{P}_1$. Based on $\mathbb{P}_1$, $\mathbb{P}_2$ was constructed by adding one image of each subject, randomly-selected from $\mathbb{P}_0$, thereby resulting in two images per probe. $\mathbb{P}_3$, $\mathbb{P}_4$, and $\mathbb{P}_5$ were constructed in a similar way.

Three combinations of models and decision metrics were compared: (i) single-image DR-GAN with the averaged cosine distances of $n_t$ representations, (ii) multi-image DRGAN with the averaged cosine distances of $n_t$ representations, and (iii) multi-image DR-GAN with the cosine distance of the fused representation. As shown in Table 3, comparing (ii) and (iii), using the coefficients learned by the network for representation fusion is superior over the conventional score averaging. There was a consistent improvement of ~0.5%. While there was some improvement from (i) to (ii), the margin decreases as $n_t$ increased.

TABLE 3

Comparison of the number of testing images on Multi-PIE.

| $n_t$ | 1 | 2 | 3 | 4 | 5 |
|---|---|---|---|---|---|
| single-image (avg.) | 84.6 | 91.8 | 94.1 | 95.3 | 95.8 |
| multi-image (avg.) | 85.9 | 92.4 | 94.5 | 95.5 | 95.9 |
| multi-image (fuse) | 85.9 | 92.8 | 95.1 | 96.0 | 96.5 |

TABLE 4

Performance comparison on CFP dataset.

| | Frontal - Frontal | | | Frontal - Profile | | |
|---|---|---|---|---|---|---|
| Method | Accuracy (%) | EER (%) | AUC (%) | Accuracy (%) | EER (%) | AUC (%) |
| Sengupta et al. [9] | 96.40± 0.69 | 3.48± 0.67 | 99.45± 0.31 | 84.91± 1.82 | 14.97± 1.98 | 93.00± 1.55 |
| Sankarana et al. [63] | 96.93± 0.61 | 2.51± 0.81 | 99.68± 0.16 | 89.17± 2.35 | 8.85± 0.9 | 97.00± 0.53 |
| Chen et al. [64] | 98.67± 0.36 | 1.40± 0.37 | 99.90± 0.09 | 91.97± 1.70 | 8.00± 1.68 | 97.70± 0.82 |
| Human | 96.24± 0.67 | 5.34± 1.79 | 98.19± 1.13 | 94.57± 1.10 | 5.02± 1.07 | 98.92± 0.46 |
| DR-GAN [27] | 97.84± 0.79 | 2.22± 0.09 | 99.72± 0.02 | 93.41± 1.17 | 6.45± 0.16 | 97.96± 0.06 |
| DR-GAN (color + split) | 97.96± 0.75 | 2.10± 0.11 | 99.75± 0.21 | 93.39± 1.23 | 6.52± 0.51 | 97.90± 0.15 |
| DR-GAN (color + split + interpolation) | 98.13± 0.81 | 1.91± 0.10 | 99.87± 0.18 | 93.64± 1.51 | 6.22± 0.32 | 98.18± 0.38 |

The present approach was also compared with state-of-the art face recognition methods on benchmark Multi-PIE, CFP, and IJB-A databases. In particular, Table 4 shows face identification performance on CFP of the present approach compared to prior methods using Accuracy, Equal Error Rate (EER), and Area Under Curve (AUC). The "color+ split" results represent the model trained with the separated $D^r$ and color images. The "color+split+interpolation" represent additional changes made by the representation interpolation described below. As appreciated from these results, the present approach is effective matching or improving recognition compared to previous techniques. Overall, performance on frontal-frontal verification was comparable while an approximate 1.7% improvement was achieved on the frontal-profile verification.

Table 5 shows the face identification performance on Multi-PIE compared to other methods with the same setting. Specifically, the present method shows a significant improvement for large-pose faces, namely a 20% improvement margin at the largest pose angles. The variation of recognition rates across different poses is much smaller than the baselines, suggesting that the learn representation of the present approach is more robust to pose variation.

Table 6 shows the performance of both face identification and verification on IJB-A. Results labeled "avg" show the performance of score fusion via average cosine distances. The row labeled "fuse" shows results of the proposed representation fusion strategy. Compared to state-of the art, the present DR-GAN achieves superior results on both verification and identification. Also, the proposed fusion scheme via learn coefficients is superior to the averaged cosine distances of representations.

TABLE 5

Identification rate (%) comparison on Multi-PIE dataset.

| Method | 0° | 15° | 30° | 45° | 60° | Average |
|---|---|---|---|---|---|---|
| Zhu et al. [65] | 94.3 | 90.7 | 80.7 | 64.1 | 45.9 | 72.9 |
| Zhu et al. [13] | 95.7 | 92.8 | 83.7 | 72.9 | 60.1 | 79.3 |
| Yim et al. [14] | 99.5 | 95.0 | 88.5 | 79.9 | 61.9 | 83.3 |
| Using L2 loss | 95.1 | 90.8 | 82.7 | 72.7 | 57.9 | 78.3 |

TABLE 5-continued

Identification rate (%) comparison on Multi-PIE dataset.

| Method | 0° | 15° | 30° | 45° | 60° | Average |
|---|---|---|---|---|---|---|
| DR-GAN [27] | 97.0 | 94.0 | 90.1 | 86.2 | 83.2 | 89.2 |
| DR-GAN | 98.1 | 94.9 | 91.1 | 87.2 | 84.6 | 90.4 |

TABLE 6

Performance comparison on IJB-A dataset.

| | Verification | | Identification | |
|---|---|---|---|---|
| Method | @FAR- = .01 | @FAR = .001 | @Rank-1 | @Rank-5 |
| OpenBR [23] | 23.6 ± 0.9 | 10.4 ± 1.4 | 24.6 ± 1.1 | 37.5 ± 0.8 |
| GOTS [23] | 40.6 ± 1.4 | 19.8 ± 0.8 | 44.3 ± 2.1 | 59.5 ± 2.0 |
| Wang et al. [25] | 72.9 ± 3.5 | 51.0 ± 6.1 | 82.2 ± 2.3 | 93.1 ± 1.4 |
| DCNN [24] | 78.7 ± 4.3 | | 85.2 ± 1.8 | 93.7 ± 1.0 |
| PAM frontal [15] | 73.3 ± 1.8 | 55.2 ± 3.2 | 77.1 ± 1.6 | 88.7 ± 0.9 |

TABLE 6-continued

Performance comparison on IJB-A dataset.

| | Verification | | Identification | |
|---|---|---|---|---|
| Method | @FAR- = .01 | @FAR = .001 | @Rank-1 | @Rank-5 |
| PAMs [15] | 82.6 ± 1.8 | 65.2 ± 3.7 | 84.0 ± 1.2 | 92.5 ± 0.8 |
| DR-GAN [27] | 77.4 ± 2.7 | 53.9 ± 4.3 | 85.5 ± 1.5 | 94.7 ± 1.1 |
| DR-GAN (avg.) | 78.3 ± 2.4 | 51.9 ± 6.7 | 88.7 ± 1.0 | 94.8 ± 0.7 |
| DR-GAN [fuse] | 83.1 ± 1.7 | 69.9 ± 2.9 | 90.1 ± 1.4 | 95.3 ± 1.1 |

As mentioned, some prior work has utilized frontalized faces for PIFR. To evaluate the identify perseveration of synthetic images from DR-GAN, face recognition was also performed using frontalized faces. Any face feature extractor could be applied to them, including $G_{enc}$ to $D^d$. However, both were trained on real images of various poses. To specialize to synthetic images, $G_{enc}$ was finetuned with the synthetic images, denoted as $f'(\cdot)$. As shown in Table 7, although the performance of the synthetic images (and its score-level fusion denoted as $f'(\hat{x})=f(x)$) is not as good as the learnt representation, using the fine-tuned $G_{enc}$ nonetheless achieves similar performance compared to prior methods, thereby demonstrating the identity preservation of the DR-GAN.

TABLE 7

Representation f(x)) vs. synthetic image x̂ on IJB-A.

| | Verification | | Identification | |
|---|---|---|---|---|
| Features | @FAR = .01 | @FAR = .001 | @Rank-1 | @Rank-5 |
| f(x̂) | 77.3 ± 1.9 | 57.7 ± 3.7 | 86.1 ± 1.6 | 94.1 ± 1.3 |
| $D^d$(x̂) | 75.9 ± 2.9 | 52.9 ± 6.2 | 84.8 ± 1.7 | 93.3 ± 1.6 |
| f'(x̂) | 78.6 ± 2.9 | 58.2 ± 7.3 | 88.2 ± 1.4 | 94.9 ± 1.1 |
| f'(x̂)&f(x) | 82.8 ± 1.8 | 69.1 ± 3.6 | 89.8 ± 1.4 | 95.3 ± 1.0 |
| f(x) | 83.1 ± 1.7 | 69.9 ± 2.9 | 90.1 ± 1.4 | 95.3 ± 1.1 |

Figure 8:
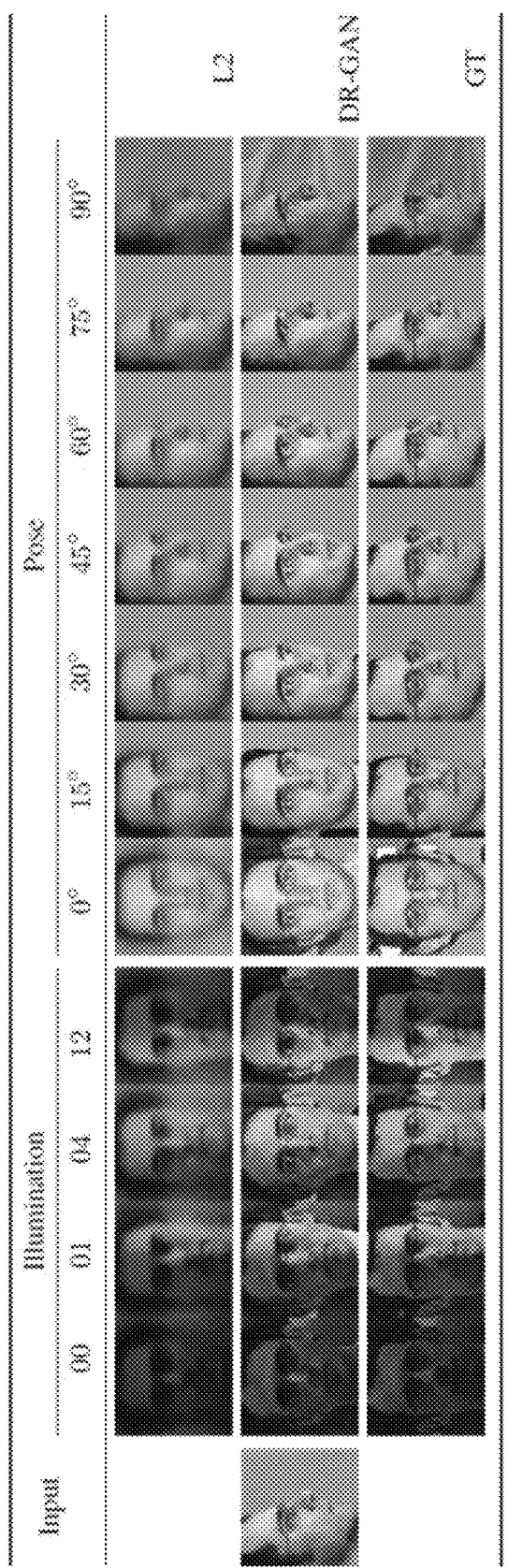
FIG. 8 shows example images comparing face rotation performed on a Multi-PIE dataset using methods, in accordance with aspects of the present disclosure.

Prior work on face rotation typically employed the L2 loss to learn a mapping between a face image with an arbitrary view and a target view. To evaluate the L2 loss relative to the present adversarial loss, a model was trained whereby G was supervised by a L2 loss on the ground truth image with the target view, instead of the adversarial loss in D. The training process and parameter settings were kept the same as in previous techniques for an equitable comparison. By way of example, FIG. 8 shows a visual comparison of the synthesized faces using these techniques. As seen from the figure, DR-GAN generates far more realistic faces that are similar to the ground truth faces in all views. Meanwhile, images synthesized by the model trained with L2 loss do not maintain high frequency components and become blurry. L2 loss treats each pixel equally, which leads to the loss of discriminative information. This inferior synthesis performance is also reflected in the lower PIFT performance in Table 5. In contrast, by integrating the adversarial lost, the present approach allows for a more discriminative representation to be learned for better recognition, and a more generative representation for better face synthesis.

Figures 9A, 9B, 9C:
FIGS. 9(a)-9(c) show images generated by an interpolation process, in accordance with aspects of the present disclosure.

In some aspects, an interpolation of variables may be performed. For instance, by taking two images of different subjects $x_1$, $x_2$, features $f(x_1)$ and $f(x_2)$ may be extracted from $G_{enc}$. The interpolation between these two can be used to generate a number of representations, which can be fed to $G_{dec}$ to synthesize face images. By way of example, FIG. 9 illustrates image synthesis by interpolating between the identity representation of two faces (far left and far right). Specifically, FIG. 9 (a) shows a transition from a female subject to a male subject with beard and glasses. These smooth semantic changes shows that the model has learned essential identity representations for image synthesis.

Similar interpolation can be conducted for the pose codes as well. During training, a one-hot vector c may be used to control the discrete pose of the synthesized image. During testing, face images could be generated with continuous poses, whose pose code may be a weighted average, i.e. an interpolation, of two neighboring pose codes. Note that the resultant pose code need no longer be a one-hot vector. As shown in FIG. 9 (b), such pose interpolation can produce a smooth pose transition from one view to many unseen views.

Furthermore, one may also interpolate the noise z. For instance, frontal faces can be synthesized at z=−1 and z=1 (a vector of all 1s) and interpolated between the two z. Given the fixed identify representation and pose code, the syndetic images are identity-preserving frontal faces. By way of example, FIG. 9 (c) shows that a change of z can lead to a change of the background, illumination condition, and facial attributes (e.g. a beard), while the identity remains preserved and faces are of the frontal view. Thus, z can model less significant face variations. Note that while utilizing $G_{dec}$, the noise vector z is randomly generated and thus the effective appearance variation induced by z would be less than that in FIG. 9 (c), which has two extreme values for z.

A generator, in accordance with the present DR-GAN framework, may also be trained to be a face rotator. That is, given one or multiple face images with arbitrary poses, multiple identity-preserved faces at different views can be generated. By way of example, FIG. 8 shows the face rotation results on Multi-PIE. Given an input image at any pose, multi-view images of the same subject with different poses or lighting conditions can be generated by specifying different pose codes or illumination codes. As appreciated from FIG. 8, rotated faces generated this way are similar to the ground truth with well-preserved attributes such as eyeglasses.

Figures 10A, 10B, 10C, 10D:
FIGS. 10(a)-10(d) show example images comparing face rotation performed on a CFP dataset using methods, in accordance with aspects of the present disclosure.

As described, one application of face rotation is face frontalization. The present DR-GAN can be used for face frontalization by specifying the frontal-view as the target pose. By way of example, FIG. 10 shows the application of face frontalization on CFP, in accordance with the present approach. Specifically, FIG. 10 (a) shows input, FIG. 10 (b) shows frontalized images, FIG. 10 (c) shows real frontal faces, and FIG. 10 (d) shows rotated faces at 15°, 30° and 45° poses. As shown, given an extreme profile input image, DR-GAN can generate a realistic frontal face that has similar identity characteristics as the real frontal face. To the best knowledge of the inventor, this is the first work that is able to frontalize a profile-view in-the-wild face image. When the input image is already in the frontal view, the synthetic images can correct the pitch and roll angles, normalize illumination and expression, and impute occluded facial areas, as shown in the last few examples of FIG. 10.

Figure 11:
FIG. 11 shows example images comparing face frontalization performed on an IJB-A dataset using methods, in accordance with aspects of the present disclosure.

In another example, FIG. 11 shows face frontalization results on a IJB-A dataset. For each subject or template in the figure, 11 input images 1100 (along with estimated coefficients indicating image quality), 11 frontalized images 1102 corresponding to the input images 1100, a ground truth frontal image 1104, and a synthetic frontal image 1106 are shown. As described, the synthetic frontal image 1106 is obtained from the fused representation of all 11 images. In accordance with the present framework, input images 1100 with low coefficients (indicative low-quality or large-pose input images) provide little contribution to the fused representation of the synthetic frontal image 1106. As appreciated from the figure, large poses, occlusion and low resolution cab pose challenges to the accuracy of an individual frontalized images 1102. Nevertheless, the synthetic frontal image 1106 provides superior quality compared each of the frontalized images 1102. This demonstrates the effectiveness of the present multi-image DR-GAN approach, in taking advantage of multiple images of the same subject for better representation learning.

Figure 12:
FIG. 12 shows example images comparing face frontalization performed on an IJB-A dataset using methods, in accordance with aspects of the present disclosure.

To further evaluate face frontalization, the number of input images was varied between 1 and 11. Referring now to the example of FIG. 12, input images 1200, a first set of frontalized images 1202, and a ground truth frontal image 1204 are shown. In addition, a second set of frontalized images 1210 is shown, where each image in the second set of frontalized images 1210 was generated by incrementally fusing representations from all previous inputs up that image (from left to right). As appreciated from the first set of frontalized images 1202, each frontalized image depends on the quality of its respective input image. However, images in the second set of frontalized images 1210 improve as the number of added images increases (from left to right).

As described, for multi-image DR-GAN, confidence coefficients can be learned for each input image by assuming that the learnt coefficient is indicative of the image quality, i.e., how good it can be used for face recognition. Therefore, a low-quality image should have a relatively poor representation and small coefficient so that it would contribute less to the fused representation. To validate this assumption, confidence coefficients were computed for all images in IJB-A and CFP databases and a plot of the distribution is shown in FIG. 13.

Figure 13A:
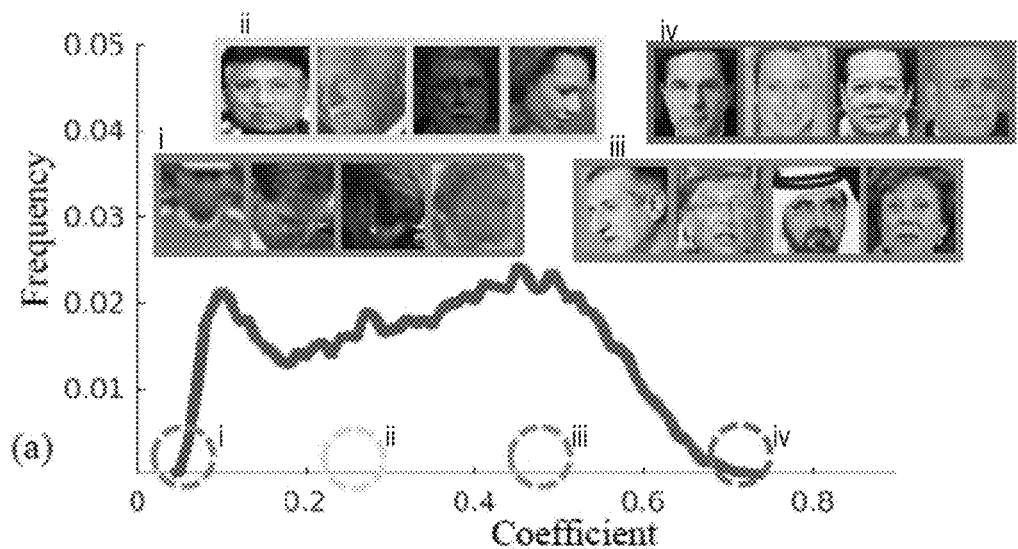
FIGS. 13 (a)-13 (b) show graphs showing coefficient distributions computed on IJB-A and CFP datasets, in accordance with aspects of the present disclosure.
Figure 13B:
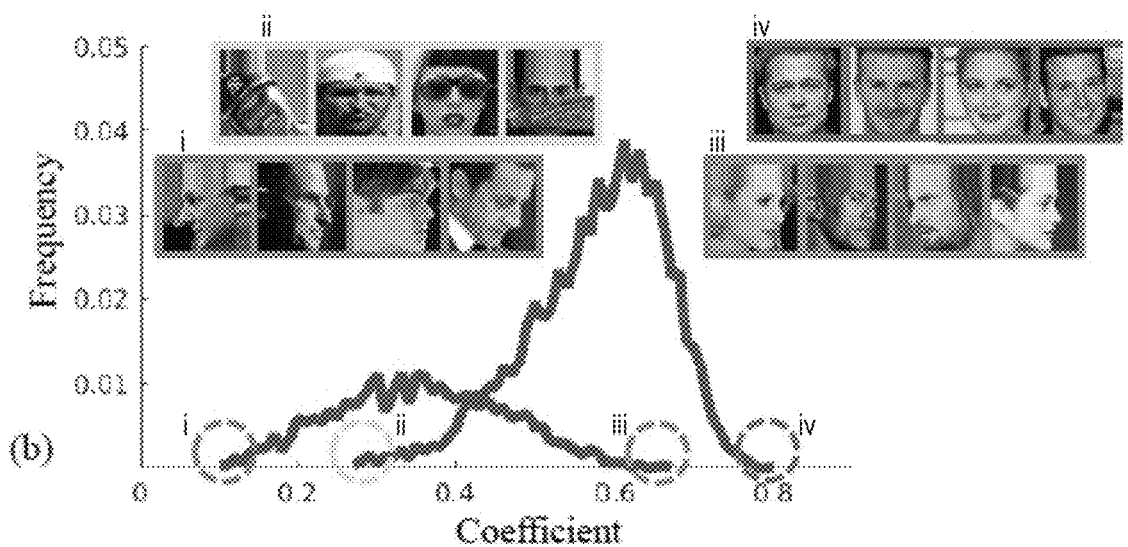

For a IJB-A dataset (FIG. 13 (a)), four example images are shown with low (i), medium-low (ii), medium-high (iii), and high coefficients (iv). As appreciated from the figure, the learnt coefficients are correlated to the image quality. Images with relatively low (e.g. i) coefficients are blurred, with large poses or failure cropping. On the other hand, images with relatively high (e.g. iv) coefficients are of very high quality with frontal faces and less occlusion. Since CFP consists of 5,000 frontal faces and 2,000 profile faces, their distributions is plotted separately in FIG. 13 (b). Despite some overlap in the middle region, the profile faces clearly have relatively low (i) coefficients compared to the frontal faces. Within each distribution, the coefficients are also related to other conditions, such as yaw angles. The low-quality images for each pose group typically include occlusion and/or challenging lighting conditions, while the high-quality ones have less occlusion and are under normal lighting.

Figure 14:
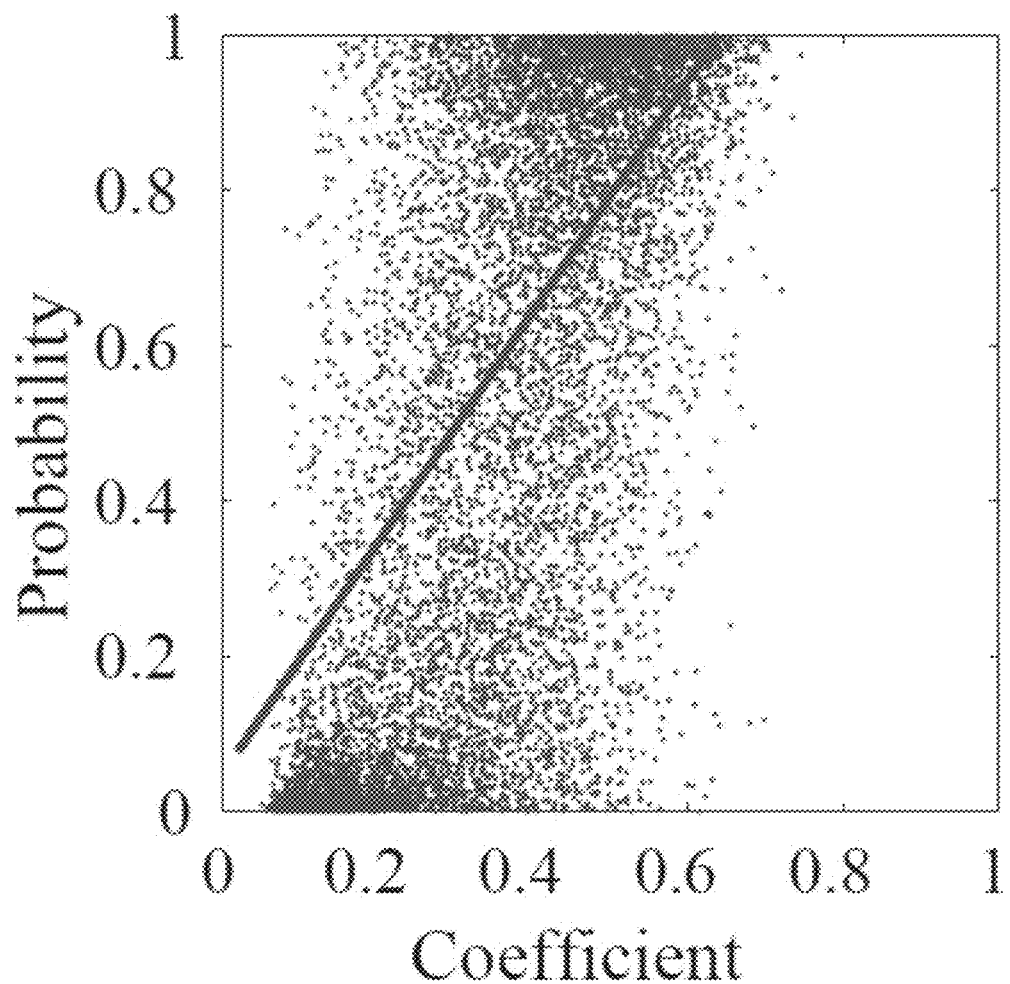
FIG. 14 is a graph showing a correlation between estimated coefficients and classification probabilities, in accordance with aspects of the present disclosure.

To quantitatively evaluate the correlation between the coefficients and face recognition performance, an identity classification experiment was performed on a IJB-A dataset. Specifically, all frames of one video were randomly selected for each subject, with half of images being used for training and the remaining half for testing. The training and testing sets shared the same identities. Therefore, in the testing stage, the output of the softmax layer could be used as the probability of each testing image belonging to the right identity class. This probability is an indicator of how well the input image can be recognized as the true identity. Therefore, the correlation between coefficients and classification probabilities estimated using the testing set was analyzed. As shown in FIG. 14, a correlation of 0.69 was observed, supporting the assumption that learnt coefficients are indicative of the image quality.

One common application of image quality is to prevent low-quality images from contributing to face recognition. To validate whether learnt coefficients have such usability, an additional experiment was designed. Specifically, for each template in the IJB-A dataset, images whose coefficients co were larger than a predefined threshold $\omega_t$ were kept. If all $\omega$ are below the threshold, only the image with the highest co was kept. Table 8 reports the performance on IJB-A, with different $\omega_t$. These results show that keeping all or majority of the samples are better than removing them. This demonstrates the effectiveness of DR-GAN to automatically diminishing the impact of low-quality images, without removing them by thresholding. Noteworthy, when $\omega_t$ is 0, all test images were included, thereby producing the same results as those in Table 6.

TABLE 8

Performance of IJB-A when removing images by threshold $\omega_t$. "Selected" shows the percentage of retained images.

| | Selected | Verification | | Identification | |
| --- | --- | --- | --- | --- | --- |
| $\omega_t$ | (%) | @FAR = .01 | @FAR = .001 | @Rank-1 | @Rank-5 |
| 0 | 100.0 | 83.1 ± 1.7 | 69.9 ± 2.9 | 90.1 ± 1.4 | 95.3 ± 1.1 |
| 0.1 | 94.9 | 83.0 ± 1.7 | 70.0 ± 2.9 | 90.4 ± 1.3 | 95.4 ± 1.0 |
| 0.25 | 71.9 | 82.4 ± 1.2 | 70.6 ± 3.0 | 89.8 ± 1.2 | 94.9 ± 1.0 |
| 0.5 | 24.6 | 79.7 ± 1.9 | 68.5 ± 4.7 | 85.6 ± 1.9 | 92.8 ± 1.6 |
| 1.0 | 5.7 | 76.7 ± 2.2 | 61.6 ± 6.2 | 82.5 ± 2.3 | 91.3 ± 1.2 |

As described, in some aspect, $G_{enc}$ may be improved by using model switch, i.e., replacing $D^d$ with $G_{enc}$ during training. As an example, Table 9 shows the performance of $G_{enc}$ for face recognition on a Multi-PIE dataset. First, $G_{enc}$ was initialized with a model trained with the softmax loss for identity classification. Then, $G_{enc}$ was used to replace $D^d$ and retrain G with random initialization. When G converged, $D^d$ was replaced with $G_{enc}$, and the above steps were repeated. Empirically, it was observed that G converged in less than 20 epochs for the Multi-PIE dataset. Hence, the model switch was performed every 20 epochs, and Table 9 reports face recognition performance of $G_{enc}$ at each switch.

TABLE 9

Performance of on Multi-PIE when keep switching to $G_{enc}$. At Epoch 0, $G_{enc}$ is trained with only the softmax loss.

| Epoch No. | 0 | 20 | 40 | 60 | 80 | 100 |
| --- | --- | --- | --- | --- | --- | --- |
| Identification rate (%) | 79.2 | 84.3 | 86.9 | 88.5 | 89.6 | 90.3 |

As appreciated from Table 9, the performance keeps improving as training goes on. In some implementations, it is envisioned that the present DR-GAN framework could be used in cooperation with a 3rd party recognizer by including such recognizer in $D^d$, for example, and further improve upon it. In this manner, the present approach can leverage and improve upon any future developments in face recognition.

As described, in the present DR-GAN approach, the learnt representation is disentangled from pose variations via the pose code. To further validate this, a visualization on the FC layer in $G_{dec}$, denoted as $h \in \mathbb{R}^{6 \times 6 \times 320}$, was performed. The goal was to select two out of the 320 filters that had the highest responses for identity and pose respectively. The assumption was that if the learnt representation was pose-invariant, there should be separate neurons to encode the identity features and pose features.

Figure 15:
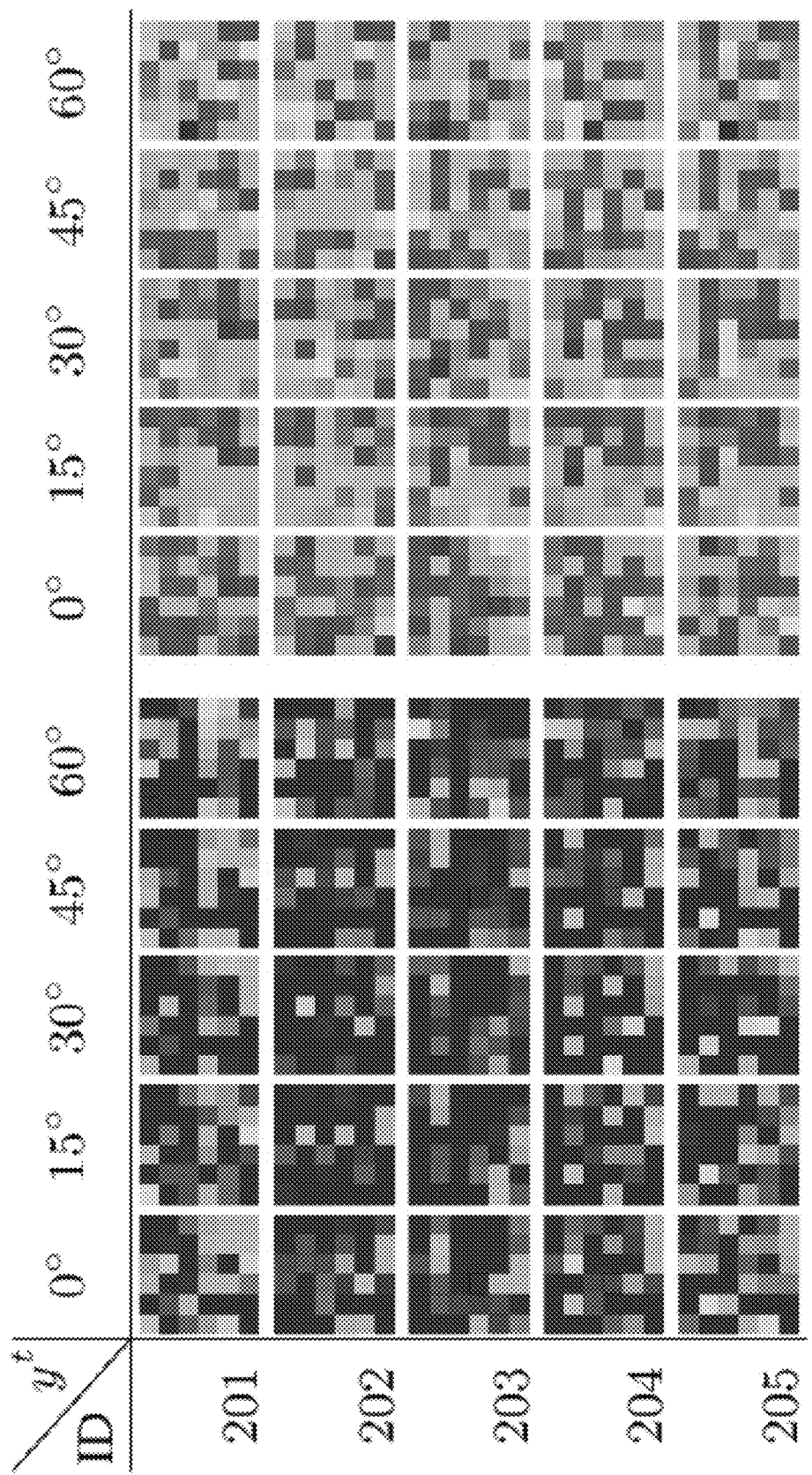
FIG. 15 is a graphical illustration showing responses of filters, in accordance with aspects of the present disclosure.

Recall that $f(x) \in \mathbb{R}^{320}$, $c \in \mathbb{R}^{13}$, and $z \in \mathbb{R}^{50}$ can be concatenated into one feature vector, which then multiplies with a weight matrix $W_{fc} \in \mathbb{R}^{(320+13+50) \times (6 \times 6 \times 320)}$, and generated the output h, with h being the feature output of one filter in FC, i.e. $h^i \in \mathbb{R}^{6 \times 6}$. Let $W_{fc} = [W_{fx}; W_c; W_z]$ denote the weight matrix with three sub-matrices, which would multiple with f(x), c, and z, respectively. Taking the identity matrix as an example, one can obtain $W_{fx} = [W^1_{fx}, W^2_{fx}, \ldots W^{320}_{fx}]$, where $W^i_{fx} \in \mathbb{R}^{320 \times 36}$. An energy vector $s_d \in \mathbb{R}^{320}$ may then be computed, where each element is $s_d^i \|W^i_{fx}\|_F$. The filter with the highest energy in can be found in $s_d$ as $k_d = \text{argmax}_i s^i_d$. Similarly, by partitioning $W_c$, another filter, $k_p$, can be found having the highest energy for the pose. Given the representation f(x) of one subject, alone with a pose code z and noise z, the responses of two filters may be computed via $h^{k_d} = (f(x); c, z)^T W_{fc}^{k_d}$ and $h^{k_d} = (f(x); c,z)^T W_{fc}^{k_p}$. By varying the subjects and pose codes, two arrays of responses may be generated for identity ($h^{k_d}$) and pose ($h^{k_d}$), as shown in FIG. 15. For both arrays, each row represents the responses of the same subject and each column represents the same pose. The responses for identity encode the identity features, where each row showed similar patterns and each column did not share similarity. By contrast, for pose responses, each column shared similar patterns while each row was not related. This visualization demonstrates that the learnt representation is pose-invariant.

Furthermore, how the dimensionalities of representations ($N_f$) and noise vectors ($N_z$) affected the recognition performance of the learnt model was explored on a CFP dataset. The recognition results are reported in Table 10. In particular, the dimensionality of noise vectors appeared to have negligible effect on the recognition performance. For this example, a dimension of 50 was chosen for its minor improvement over others and its ability to incorporate variations other than poses during the synthesis. However, the dimensionality of representations has more impact, and 320 appeared to perform the best in this example.

TABLE 10

Effect of vector dimension on CFP performance.

| | $N_z$ | | | | | |
|---|---|---|---|---|---|---|
| | Frontal-Frontal | | | Frontal-Profile | | |
| $N_f$ | 0 | 10 | 50 | 0 | 10 | 50 |
| 160 | 97.22 | 97.20 | 97.34 | 91.71 | 91.65 | 91.62 |
| 240 | 97.76 | 97.84 | 97.82 | 92.29 | 92.59 | 92.41 |
| 320 | 97.99 | 98.09 | 98.13 | 93.62 | 93.64 | 93.64 |
| 400 | 97.86 | 97.95 | 98.02 | 93.47 | 93.68 | 93.59 |

The present invention has been described in terms of one or more preferred embodiments, and it should be appreciated that many equivalents, alternatives, variations, and modifications, aside from those expressly stated, are possible and within the scope of the invention.

The invention claimed is:

1. A method for identifying a subject using imaging, the method comprising:
   receiving an image depicting a subject to be identified;
   applying a trained Generative Adversarial Network (GAN) to the image to generate an identity representation of the subject, wherein the GAN comprises a discriminator and a generator, the generator including at least one encoder and a decoder;
   wherein generating the identity representation of the subject includes weighing features associated with each of a plurality of images for the subject using learning coefficients, the identity representation being disentangled from pose variations;
   generating at least one synthetic image based on the identity representation, the at least one synthetic image including a rotated pose of the subject, the rotated pose of the subject in the at least one synthetic image being different from a pose of the subject in the image;
   identifying the subject using the identity representation; and
   generating a report indicative of the subject identified.

2. The method of claim 1, wherein the method further comprises extracting the identity representation by inputting the image into the at least one encoder of the GAN.

3. The method of claim 1, wherein the method further comprises determining the pose of the subject depicted in the image.

4. The method of claim 1, wherein the method further comprises receiving the plurality of images depicting the subject.

5. The method of claim 4, wherein the at least one encoder comprises a plurality of encoders, wherein the method further comprises generating the features associated with each of the plurality of images by inputting the plurality of images into respective encoders of the plurality of encoders of the GAN.

6. The method of claim 5, wherein the method further comprises combining the features associated with each of the plurality of images to generate the identity representation.

7. The method of claim 1, wherein the method further comprises generating the at least one synthetic image by inputting the identity representation, a noise vector and a target pose code into the decoder.

8. The method of claim 7, wherein the at least one synthetic image is an image at the rotated pose corresponding to the target pose code.

9. The method of claim 7, wherein the method further comprises classifying the at least one synthetic image by providing the at least one synthetic image and the image to the discriminator.

10. The method of claim 7, wherein the rotated pose of the subject in the at least one synthetic image is different than the pose of the subject in the image.

11. The method of claim 10, wherein the rotated pose of the subject in the at least one synthetic image differs by up to 90° from the pose of the subject in the image.

12. A system for identifying a subject using imaging, the system comprising:
   an input for receiving images depicting a subject to be identified;
   a processor programmed to carry out instructions for processing images received by the input, the instructions comprising:
      applying a trained Generative Adversarial Network (GAN) to at least one image to generate an identity representation of the subject, wherein the GAN comprises a discriminator and a generator, the generator including at least one encoder and a decoder;
      generating the identity representation of the subject by weighing features associated with each of a plurality of images for the subject using learning coefficients, the identity representation being disentangled from pose variations;

generating at least one synthetic image based on the identity representation, the at least one synthetic image including a rotated pose of the subject, the rotated pose of the subject in the at least one synthetic image being different from a pose of the subject in the image;

identifying the subject using the identity representation;

generating a report indicative of the subject identified; and an output for providing the at least one synthetic image and the report.

13. The system of claim 12, wherein the processor is further programmed to carry out instructions to determine the pose of the subject from the image received from the input.

14. The system of claim 12, wherein the at least one encoder comprises a plurality of encoders, and wherein the processor is further programmed to carry out instructions to generate feature vectors by inputting received images into respective encoders of the plurality of encoders of the GAN.

15. The system of claim 14, wherein the processor is further programmed to carry out instructions to combine the features into a combined feature vector using the learned coefficients.

16. The system of claim 15, wherein the processor is further programmed carry out instructions to use at least one of the features or the combined feature vector to generate the identity representation.

17. The system of claim 12, wherein the processor is further programmed carry out instructions to generate the at least one synthetic image by inputting the identity representation, a noise vector and a target pose code into the decoder.

18. The system of claim 17, wherein the at least one synthetic image is an image at the rotated pose corresponding to the target pose code.

19. The system of claim 17, wherein the processor is further programmed carry out instructions to classify the at least one synthetic image by providing the at least one synthetic image and the at least one image to the discriminator.

20. A method for image recognition and rendering, the method comprising:

receiving an image depicting a subject to be identified;

applying a trained Generative Adversarial Network (GAN) to the image to generate an identity representation of the subject, wherein the GAN comprises a discriminator and a generator, the generator for performing a generative function of the GAN using an encoder and a decoder;

extracting the identity representation by inputting the image into the encoder and by weighing features associated with each of a plurality of images for the subject using learning coefficients, the identity representation being disentangled from pose variations; and generating a synthetic image by inputting the identity representation into the decoder, the synthetic image including a rotated subject of the subject in the image, the rotated pose of the subject in the synthetic image being different from a pose of the subject in the image.

21. A method for image recognition and rendering, the method comprising:

receiving an image depicting a subject;

determining a pose of the subject depicted in the image;

receiving a plurality of images depicting the subject;

applying a trained Generative Adversarial Network (GAN) to the image, wherein the GAN comprises a discriminator and a generator, the generator including an encoder and a decoder;

generating features associated with each of the plurality of images;

combining the features associated with each of the plurality of images to generate an identity representation;

generating the identity representation of the subject by weighing the features associated with each of the plurality of images using learning coefficients, the identity representation being disentangled from pose variations;

generating at least one synthetic image based on the identity representation, the at least one synthetic image including a rotated pose of the subject, the rotated pose of the subject in the at least one synthetic image being different from the pose of the subject in the image.

22. The method of claim 21, wherein the generating the identity representation comprises:

extracting the identity representation by inputting the image into the encoder.

23. The method of claim 21, wherein the generating the at least one synthetic image comprises:

inputting the identity representation into the decoder; and generating the synthetic image from the decoder.

24. The method of claim 21, wherein the encoder comprises a plurality of encoders, wherein the generating the features associated with each of the plurality of images further comprises inputting the images into respective encoders of the plurality of encoders of the GAN.

25. The method of claim 21, wherein the method further comprises classifying the at least one synthetic image by providing the at least one synthetic image and the image to the discriminator.

26. The method of claim 21, wherein the generating the at least one synthetic image further comprising inputting the identity representation, a noise vector and a target pose code into the decoder.

27. The method of claim 21, wherein the at least one synthetic image is a frontal image.

28. The method of claim 21, wherein the rotated pose of the subject in the at least one synthetic image differs by up to 90° from the pose of the subject in the image.

* * * * *